(12) United States Patent
Langholz et al.

(10) Patent No.: US 11,455,093 B2
(45) Date of Patent: *Sep. 27, 2022

(54) CAPTURING AND SENDING MULTIMEDIA AS ELECTRONIC MESSAGES

(71) Applicant: Meta Platforms, Inc., Menlo Park, CA (US)

(72) Inventors: Benjamin S. Langholz, San Francisco, CA (US); Lucy Congyun Zhang, Palo Alto, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/197,615

(22) Filed: Mar. 10, 2021

(65) Prior Publication Data

US 2021/0191589 A1 Jun. 24, 2021

Related U.S. Application Data

(63) Continuation of application No. 15/191,157, filed on Jun. 23, 2016, now Pat. No. 10,976,915, which is a
(Continued)

(51) Int. Cl.
*G06F 3/0488* (2022.01)
*G06F 3/0481* (2022.01)
(Continued)

(52) U.S. Cl.
CPC .......... *G06F 3/0488* (2013.01); *G06F 3/0481* (2013.01); *G06F 3/0482* (2013.01);
(Continued)

(58) Field of Classification Search
CPC ......... G06F 2203/04803; G06F 3/0481; G06F 3/0482; G06F 3/04842; G06F 3/04847;
(Continued)

(56) References Cited

U.S. PATENT DOCUMENTS

| 2,011 A | 3/1841 | Wemmer |
| 14,092 A | 1/1856 | Cumings |

(Continued)

FOREIGN PATENT DOCUMENTS

| CN | 103685729 A | 3/2014 |
| CN | 105793809 A | 7/2016 |

(Continued)

OTHER PUBLICATIONS

Apple: "Apple iPhone 4s running iOS version 7.0.6", iPhone 4S Running iOS 7, Sep. 2013.
(Continued)

*Primary Examiner* — Beau D Spratt
*Assistant Examiner* — Reji Kartholy
(74) *Attorney, Agent, or Firm* — Keller Preece PLLC

(57) ABSTRACT

One or more embodiments described herein include methods and systems of capturing and sending multimedia content items as electronic message. More specifically, systems and methods described herein provide users the ability to easily and effectively capture multimedia content items for inclusion in a communication session without navigating away from the communication session. Additionally, systems and methods described herein allow a multimedia content item to be sent to one or more co-users immediately following the capture of the multimedia content item without further user interaction. In other words, the system and methods can capture and automatically send a multimedia content item in response to a single user interaction.

20 Claims, 13 Drawing Sheets

Related U.S. Application Data continuation of application No. 14/314,623, filed on Jun. 25, 2014, now Pat. No. 9,391,934.

(60) Provisional application No. 61/985,456, filed on Apr. 28, 2014.

(51) Int. Cl.

| | | |
|---|---|---|
| *G06F 3/04842* | (2022.01) | |
| *G06F 3/16* | (2006.01) | |
| *G06F 3/04886* | (2022.01) | |
| *H04L 51/02* | (2022.01) | |
| *H04N 5/232* | (2006.01) | |
| *H04L 51/52* | (2022.01) | |
| *H04L 51/216* | (2022.01) | |
| *H04L 51/066* | (2022.01) | |
| *G06F 3/0482* | (2013.01) | |
| *G06F 3/04847* | (2022.01) | |
| *H04L 51/10* | (2022.01) | |
| *H04N 7/14* | (2006.01) | |
| *G06T 11/00* | (2006.01) | |
| *H04L 51/04* | (2022.01) | |

(52) U.S. Cl.
CPC ...... *G06F 3/04842* (2013.01); *G06F 3/04847* (2013.01); *G06F 3/04886* (2013.01); *G06F 3/16* (2013.01); *G06T 11/001* (2013.01); *H04L 51/02* (2013.01); *H04L 51/066* (2013.01); *H04L 51/10* (2013.01); *H04L 51/216* (2022.05); *H04L 51/52* (2022.05); *H04N 5/23216* (2013.01); *H04N 5/23293* (2013.01); *H04N 7/142* (2013.01); *G06F 2203/04803* (2013.01); *G06T 2200/24* (2013.01); *H04L 51/04* (2013.01)

(58) Field of Classification Search
CPC ...... G06F 3/0488; G06F 3/04886; G06F 3/16; G06T 11/001; G06T 2200/24; H04L 51/02; H04L 51/04; H04L 51/066; H04L 51/10; H04L 51/16; H04L 51/32; H04N 5/23216; H04N 5/23293; H04N 7/142
See application file for complete search history.

(56) References Cited

U.S. PATENT DOCUMENTS

| | | | |
|---|---|---|---|
| 14,312 | A | 2/1856 | Gold |
| 5,477,264 | A | 12/1995 | Sarbadhikari et al. |
| 6,473,769 | B1 | 10/2002 | Andrew et al. |
| 8,428,453 | B1 | 4/2013 | Spiegel et al. |
| 8,738,705 | B2 | 5/2014 | Kelmenson et al. |
| 9,246,961 | B2 | 1/2016 | Walkin et al. |
| 9,391,933 | B2 | 7/2016 | Langholz |
| 9,391,934 | B2 | 7/2016 | Langholz |
| 9,836,207 | B2 | 12/2017 | Langholz |
| 10,095,385 | B2 | 10/2018 | Walkin et al. |
| 2004/0019611 | A1 | 1/2004 | Pearse et al. |
| 2006/0123086 | A1 | 6/2006 | Morris |
| 2006/0215242 | A1 | 9/2006 | Besharat et al. |
| 2006/0223502 | A1 | 10/2006 | Doulton |
| 2007/0054678 | A1 | 3/2007 | Doulton |
| 2007/0136750 | A1 | 6/2007 | Abanami et al. |
| 2007/0258113 | A1 | 11/2007 | Vau et al. |
| 2008/0055269 | A1* | 3/2008 | Lemay ............... H04L 51/043 345/169 |
| 2008/0119235 | A1 | 5/2008 | Nielsen et al. |
| 2008/0288338 | A1 | 11/2008 | Wiseman et al. |
| 2009/0027480 | A1 | 1/2009 | Choi |
| 2009/0070675 | A1 | 3/2009 | Li |
| 2009/0070820 | A1 | 3/2009 | Li |
| 2009/0177981 | A1 | 7/2009 | Christie et al. |
| 2010/0050086 | A1 | 2/2010 | Sherrard et al. |
| 2010/0123724 | A1 | 5/2010 | Moore et al. |
| 2010/0124906 | A1 | 5/2010 | Hautala |
| 2010/0150322 | A1 | 6/2010 | Yin et al. |
| 2010/0169772 | A1 | 7/2010 | Stallings et al. |
| 2010/0231523 | A1 | 9/2010 | Chou |
| 2010/0234077 | A1 | 9/2010 | Yoo et al. |
| 2010/0262924 | A1 | 10/2010 | Kalu |
| 2010/0267369 | A1 | 10/2010 | Lim et al. |
| 2010/0332518 | A1 | 12/2010 | Song et al. |
| 2011/0069196 | A1 | 3/2011 | Jung et al. |
| 2011/0081952 | A1 | 4/2011 | Song et al. |
| 2011/0086647 | A1 | 4/2011 | Riddle et al. |
| 2011/0119619 | A1 | 5/2011 | Fong et al. |
| 2011/0163971 | A1 | 7/2011 | Wagner et al. |
| 2011/0246502 | A1 | 10/2011 | Aguera Y Arcas et al. |
| 2011/0267530 | A1 | 11/2011 | Chun |
| 2011/0276901 | A1 | 11/2011 | Zambetti et al. |
| 2011/0276904 | A1 | 11/2011 | Mehin et al. |
| 2011/0319131 | A1 | 12/2011 | An et al. |
| 2012/0022865 | A1 | 1/2012 | Milstein |
| 2012/0023436 | A1 | 1/2012 | Brown et al. |
| 2012/0102403 | A1 | 4/2012 | Pennington et al. |
| 2012/0110064 | A1 | 5/2012 | Chen et al. |
| 2012/0124483 | A1 | 5/2012 | Zuckerberg et al. |
| 2012/0190388 | A1 | 7/2012 | Castleman et al. |
| 2012/0269334 | A1 | 10/2012 | Goguen et al. |
| 2012/0284659 | A1 | 11/2012 | De Leon |
| 2012/0317210 | A1 | 12/2012 | Fisher et al. |
| 2013/0072221 | A1 | 3/2013 | Chen et al. |
| 2013/0083215 | A1 | 4/2013 | Wisniewski |
| 2013/0091443 | A1 | 4/2013 | Park et al. |
| 2013/0093833 | A1* | 4/2013 | Al-Asaaed ......... H04N 1/00106 348/14.02 |
| 2013/0101097 | A1 | 4/2013 | Shaw |
| 2013/0117378 | A1 | 5/2013 | Kotorov et al. |
| 2013/0120447 | A1 | 5/2013 | Kim et al. |
| 2013/0122944 | A1* | 5/2013 | Yun ..................... H04W 4/06 455/466 |
| 2013/0179800 | A1 | 7/2013 | Jeong et al. |
| 2013/0227455 | A1 | 8/2013 | Lee et al. |
| 2013/0235074 | A1 | 9/2013 | Cherna et al. |
| 2013/0239031 | A1 | 9/2013 | Ubillos et al. |
| 2013/0246138 | A1 | 9/2013 | Johnson et al. |
| 2013/0275525 | A1 | 10/2013 | Molina et al. |
| 2013/0326384 | A1 | 12/2013 | Moore et al. |
| 2013/0332870 | A1 | 12/2013 | Kim et al. |
| 2014/0009475 | A1 | 1/2014 | Setton et al. |
| 2014/0040764 | A1 | 2/2014 | Stoop et al. |
| 2014/0040773 | A1 | 2/2014 | Sanghavi et al. |
| 2014/0052794 | A1 | 2/2014 | Tucker et al. |
| 2014/0063175 | A1* | 3/2014 | Jafry ................... H04L 65/1069 348/14.02 |
| 2014/0085487 | A1* | 3/2014 | Park ................... G06F 3/04883 348/207.1 |
| 2014/0118563 | A1 | 5/2014 | Mehta et al. |
| 2014/0141836 | A1* | 5/2014 | Rozumyanskiy ..... G06F 40/174 382/229 |
| 2014/0184544 | A1 | 7/2014 | Lim et al. |
| 2014/0253463 | A1 | 9/2014 | Hicks |
| 2014/0253522 | A1 | 9/2014 | Cueto |
| 2014/0258426 | A1 | 9/2014 | Lee |
| 2014/0289664 | A1 | 9/2014 | Honda et al. |
| 2015/0040029 | A1 | 2/2015 | Koum et al. |
| 2015/0052484 | A1 | 2/2015 | Huang |
| 2015/0058754 | A1 | 2/2015 | Rauh |
| 2015/0089389 | A1 | 3/2015 | Cohen-Zur et al. |
| 2015/0135108 | A1 | 5/2015 | Pope et al. |
| 2015/0149927 | A1 | 5/2015 | Walkin et al. |
| 2015/0154676 | A1 | 6/2015 | Matousek et al. |
| 2015/0178968 | A1 | 6/2015 | Salmi et al. |
| 2015/0206349 | A1 | 7/2015 | Rosenthal et al. |
| 2015/0264303 | A1 | 9/2015 | Chastney et al. |
| 2015/0312175 | A1 | 10/2015 | Langholz |
| 2015/0312182 | A1 | 10/2015 | Langholz |
| 2015/0312184 | A1 | 10/2015 | Langholz et al. |
| 2015/0312185 | A1 | 10/2015 | Langholz et al. |
| 2016/0050289 | A1 | 2/2016 | Cohen et al. |
| 2016/0127287 | A1 | 5/2016 | Oh et al. |

(56) References Cited

U.S. PATENT DOCUMENTS

| | | |
|---|---|---|
| 2016/0132200 A1 | 5/2016 | Walkin et al. |
| 2016/0283109 A1 | 9/2016 | Langholz |
| 2016/0299658 A1 | 10/2016 | Langholz |
| 2018/0081518 A1 | 3/2018 | Langholz et al. |

FOREIGN PATENT DOCUMENTS

| | | |
|---|---|---|
| EP | 1653398 A1 | 5/2006 |
| EP | 2582120 | 4/2013 |
| EP | 2654274 A1 | 10/2013 |
| EP | 2712165 | 3/2014 |
| EP | 2879086 A1 | 6/2015 |
| JP | H11308434 A | 11/1999 |
| JP | 2004-304297 A | 10/2004 |
| JP | 2008-142332 A | 6/2008 |
| JP | 2013-161167 A | 8/2013 |
| JP | 2013-214283 A | 10/2013 |
| JP | 2014-063342 A | 4/2014 |
| KR | 10-2012-0003566 | 1/2012 |
| KR | 20120023405 A | 3/2012 |
| KR | 20130049416 A | 5/2013 |
| KR | 20130112040 A | 10/2013 |
| KR | 10-1331444 B1 | 11/2013 |
| KR | 10-2014-0012504 | 2/2014 |
| KR | 10-2014-0039737 | 4/2014 |
| WO | WO 2011085248 A1 | 7/2011 |
| WO | WO-2015080744 A1 | 6/2015 |

OTHER PUBLICATIONS

International Search Report as received in PCT/US2014/043703 dated Jan. 12, 2015.
International Search Report as received in PCT/US2014/044138 dated Jan. 12, 2015.
Examination Report as received in Indian Application 201647026382 dated Sep. 21, 2020.
Extended European Search Report as received in EP14173880.7 dated Oct. 1, 2015.
Extended European Search Report as received in EP14173537.3 dated Oct. 5, 2015.
Summons to attend oral proceedings as received in European application 14173537.3 dated Feb. 25, 2020.
Office Action as received in European application 14173537.3 dated Apr. 15, 2019.
Office Action as received in Japanese application 2016-554631 dated Aug. 8, 2017—English translation.
Office Action as received in Japanese application 2016-554683 dated Aug. 1, 2017—English translation.
Office Action as received in Brazilian application BR112016019976-6 dated Mar. 17, 2020.
Office Action as received in Brazilian Application BR112016025271-3 dated Apr. 1, 2020.
XP55215941: "Illustration of features of the iMessage Software of iOS 7", as released withiOS7 by Apple on Sep. 18, 2013, pp. 1-11, [screen shots taken on Sep. 22, 2015].
XP055215944**: "The History of iOS", Sep. 1, 2013, Retrieved from the Internet: URL:http://chaione.comiwp-content/uploads/2013/09/history-of-ios-inographic-Final.png [retrieved on Sep. 24, 2015].
Examination Report as received in Indian Application 201647026505 dated Dec. 18, 2020.
U.S. Appl. No. 14/311,758, Sep. 30, 2015, Office Action.
U.S. Appl. No. 14/311,758, Mar. 8, 2016, Notice of Allowance.
U.S. Appl. No. 14/308,188, May 9, 2016, Office Action.
U.S. Appl. No. 14/308,188, Oct. 5, 2016, Office Action.
U.S. Appl. No. 14/308,188, Jul. 10, 2017, Office Action.
U.S. Appl. No. 14/308,188, Jan. 4, 2018, Office Action.
U.S. Appl. No. 14/308,188, Jul. 13, 2020, Notice of Allowance.
U.S. Appl. No. 14/312,481, Mar. 29, 2016, Office Action.
U.S. Appl. No. 14/312,481, Aug. 3, 2016, Office Action.
U.S. Appl. No. 14/312,481, Nov. 22, 2016, Office Action.
U.S. Appl. No. 14/312,481, May 12, 2017, Office Action.
U.S. Appl. No. 14/312,481, Sep. 7, 2017, Notice of Allowance.
U.S. Appl. No. 14/314,623, Jul. 9, 2015, Office Action.
U.S. Appl. No. 14/314,623, Oct. 27, 2015, Office Action.
U.S. Appl. No. 14/314,623, Mar. 14, 2016, Notice of Allowance.
U.S. Appl. No. 15/179,584, Apr. 6, 2018, Office Action.
U.S. Appl. No. 15/179,584, Sep. 24, 2018, Office Action.
U.S. Appl. No. 15/179,584, Feb. 28, 2019, Office Action.
U.S. Appl. No. 15/179,584, Aug. 22, 2019, Office Action.
U.S. Appl. No. 15/179,584, Apr. 29, 2020, Notice of Allowance.
U.S. Appl. No. 15/191,157, Sep. 7, 2018, Office Action.
U.S. Appl. No. 15/191,157, Jan. 25, 2019, Office Action.
U.S. Appl. No. 15/191,157, Oct. 15, 2019, Office Action.
U.S. Appl. No. 15/191,157, Feb. 18, 2020, Office Action.
U.S. Appl. No. 15/191,157, Nov. 18, 2020, Notice of Allowance.
U.S. Appl. No. 15/826,032, Dec. 16, 2019, Office Action.
U.S. Appl. No. 15/826,032, May 19, 2020, Office Action.
U.S. Appl. No. 15/826,032, Sep. 25, 2020, Office Action.
U.S. Appl. No. 15/826,032, Feb. 10, 2021, Office Action.
Notification of Reason for Rejection dated Apr. 3, 2018 for Japanese Application No. 2016-534673, filed Nov. 4, 2016, 8 Pages.
Extended European Search Report as received in European Application 20212574.6 dated Apr. 20, 2021.
Notification of Reason for Rejection dated Oct. 10, 2017 for Japanese Application No. 2016-534673, filed Nov. 4, 2016, 8 pages.
Extended European Search Report as received in European Application 21155455.5 dated Jun. 29, 2021.
U.S. Appl. No. 15/826,032, Jun. 28, 2021, Office Action.
Aoki E., "How to Use Smartphone Efficiently for Improving Your Job Skill and Life by Purpose (1)," Nikkei Business Publications, Inc, Jun. 11, 2012, vol. 651, 7 pages.
Aoki E., "Staple Snss Easy and Convenient Techniques to Use Them," Nikkei Business Publications, Inc, Sep. 23, 2013, vol. 682, 4 Pages.
Co-Pending U.S. Appl. No. 14/092,716, filed Nov. 27, 2013, 75 Pages.
Co-Pending U.S. Appl. No. 14/092,736, filed Nov. 27, 2013, 75 Pages.
Co-Pending U.S. Appl. No. 14/308,188, filed Jun. 18, 2014, 75 Pages.
Co-Pending U.S. Appl. No. 14/312,481, filed Jun. 23, 2014, 75 Pages.
Co-Pending U.S. Appl. No. 14/314,623, filed Jun. 25, 2014, 69 Pages.
Co-Pending U.S. Appl. No. 61/868,960, filed Aug. 22, 2013, 61 Pages.
Co-Pending U.S. Appl. No. 14/311,758, filed Jun. 23, 2014, 66 Pages.
Decision of Rejection dated Apr. 3, 2018 for Japanese Application No. 2016-534673, filed Nov. 4, 2016, 8 Pages.
Extended European Search Report for European U.S. Appl. No. 14/171,709, dated Feb. 23, 2015, 7 Pages.
Extended European Search Report for European Application No. 18201224.5, dated Nov. 28, 2018, 9 Pages.
International Preliminary Report on Patentability for International Application No. PCT/US2014/043703, dated Nov. 10, 2016, 10 Pages.
International Preliminary Report on Patentability for International Application No. PCT/US2014/044138, dated Nov. 10, 2016, 9 Pages.
International Search Report for International Application No. PCT/US2013/072415, dated Aug. 25, 2014, 6 Pages.
Non-Final Office Action dated Mar. 29, 2016 for U.S. Appl. No. 14/312,481, filed Jun. 23, 2014, 19 Pages.
Notice of Allowance dated Sep. 17, 2015 for U.S. Appl. No. 14/092,736, filed Nov. 27, 2013, 34 Pages.
Notice of Allowance dated May 22, 2018 for U.S. Appl. No. 15/001,044, filed Jan. 19, 2016, 64 Pages.
Notice of Preliminary Rejection dated Nov. 25, 2019 for Korean Application No. 10-2016-7013449, filed Nov. 27, 2013, 11 Pages.
Notification of the First Office Action dated Oct. 23, 2018 for Chinese Application No. 2013800812328, filed Nov. 27, 2013, 13 Pages.

(56) References Cited

OTHER PUBLICATIONS

Office Action dated Sep. 1, 2015 for U.S. Appl. No. 14/092,716, filed Nov. 27, 2013, 36 Pages.
Office Action dated Jun. 4, 2019 for Mexican Application No. MXa2016006508, filed Nov. 27, 2013, 16 Pages.
Office Action dated Mar. 9, 2016 for U.S. Appl. No. 14/092,716, filed Nov. 27, 2013, 19 Pages.
Office Action dated Sep. 9, 2016 for U.S. Appl. No. 14/092,716, filed Nov. 27, 2013, 24 Pages.
Office Action dated Feb. 10, 2017 for U.S. Appl. No. 14/092,716, filed Nov. 27, 2013, 27 Pages.
Office Action dated May 11, 2020 for Chinese Application No. 201480078512.8, filed Jun. 25, 2014, 16 Pages.
Office Action dated Sep. 15, 2017 for U.S. Appl. No. 14/092,716, filed Nov. 27, 2013, 37 Pages.
Office Action dated Jan. 24, 2018 for U.S. Appl. No. 14/092,716, filed Nov. 27, 2013, 32 Pages.
Spector L., "Your Complete Guide to the Android Camera," TechHive [Online], Jan. 2, 2013 [Retrieved on Aug. 17, 2015], 13 Pages, Retrieved from the Internet: URL: http://www.techhive.com/article/2021321/your-complete-guide-to-the-android-camera.html.
Summons to attend oral proceedings mailed Feb. 8, 2018 for European Application No. 14171709.0, filed Jun. 10, 2014, 13 pages.
Suzuki T., "Section 46 Let's Share Photos Using Facebook Camera," Basics and Convenient Techniques for Active Use of Smartphone, Easy Guide to Start-Mini, Japan, Dec. 15, 2012, 6 Pages.
UXarchive.com, Snapchat, "Snapchat user flow description," Oct. 23, 2012, 2 pages, Retrieved from the Internet: URL: http://web.archive.org/web/20150912095220/http://uxarchive.com/apps/snapchat.
Office Action dated Jan. 30, 2022 for Chinese Application No. 201480078512.8, filed Jun. 25, 2014, 13 pages.

\* cited by examiner

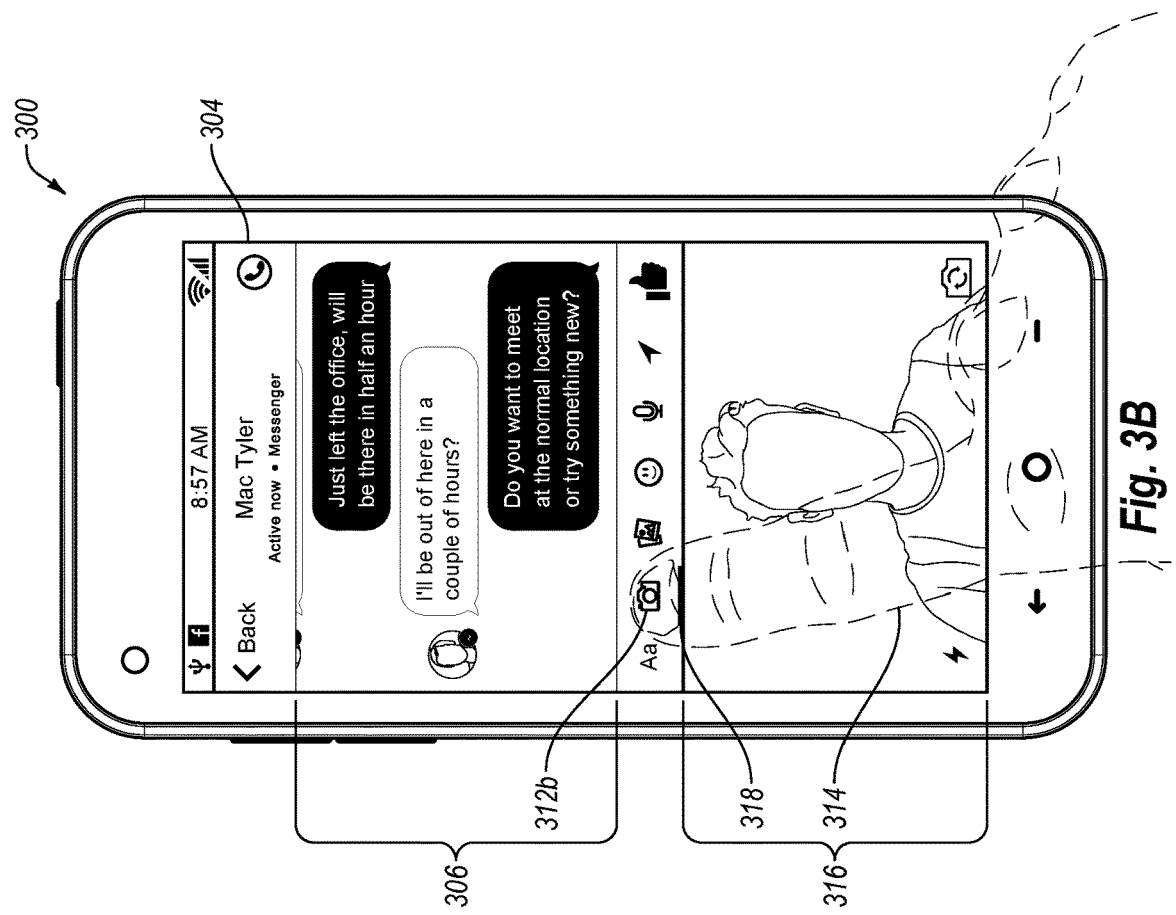
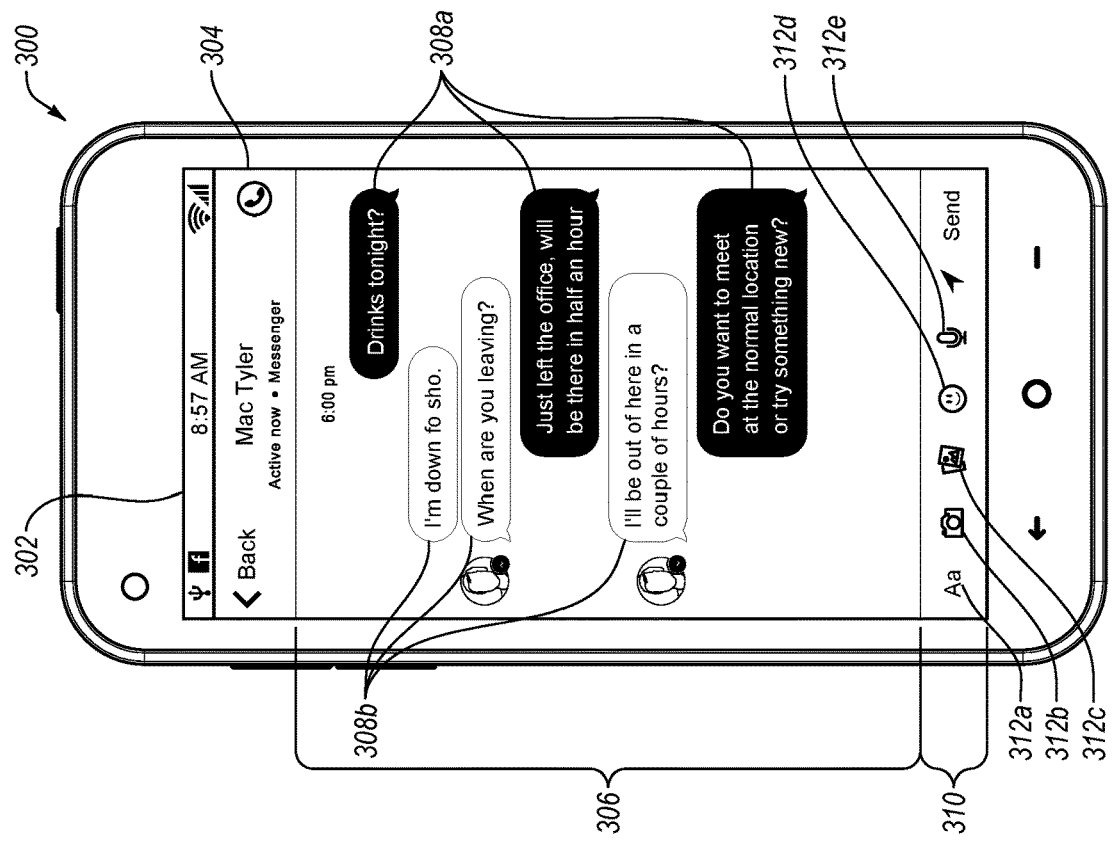
Fig. 3B
Fig. 3A

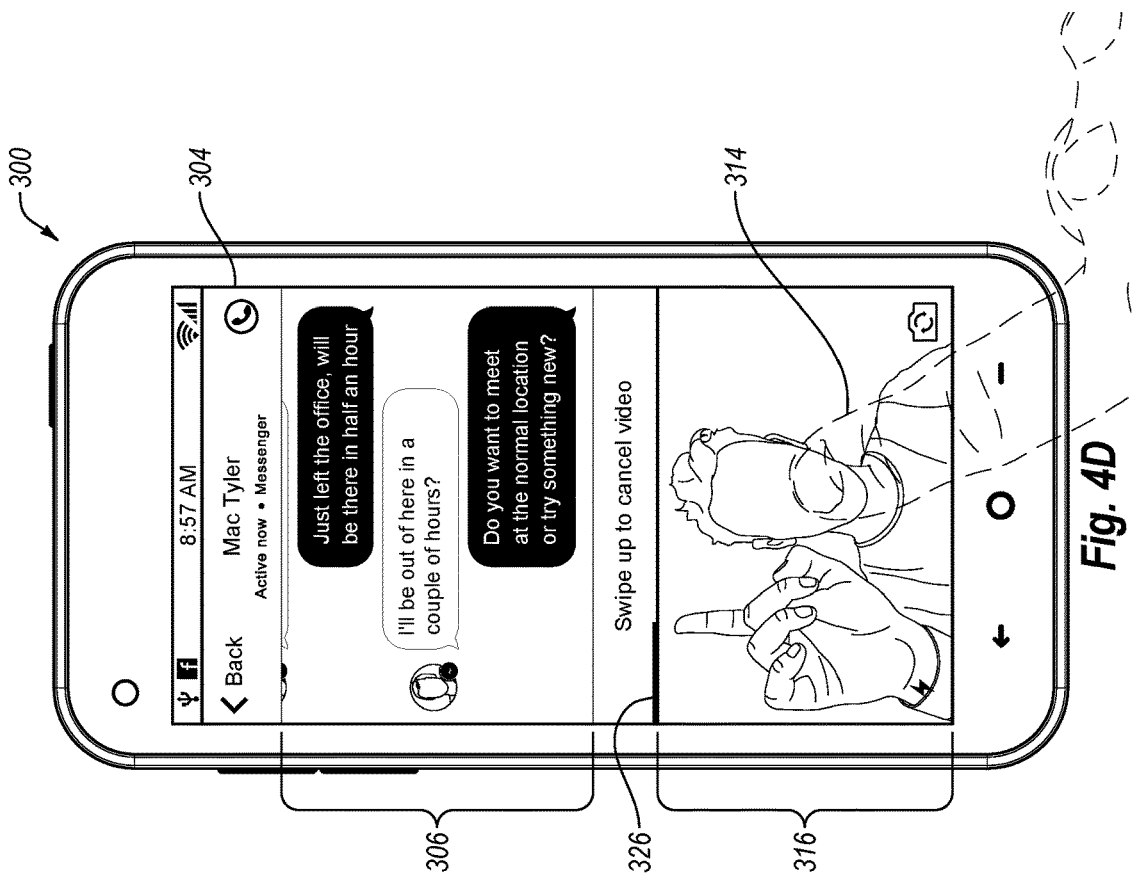
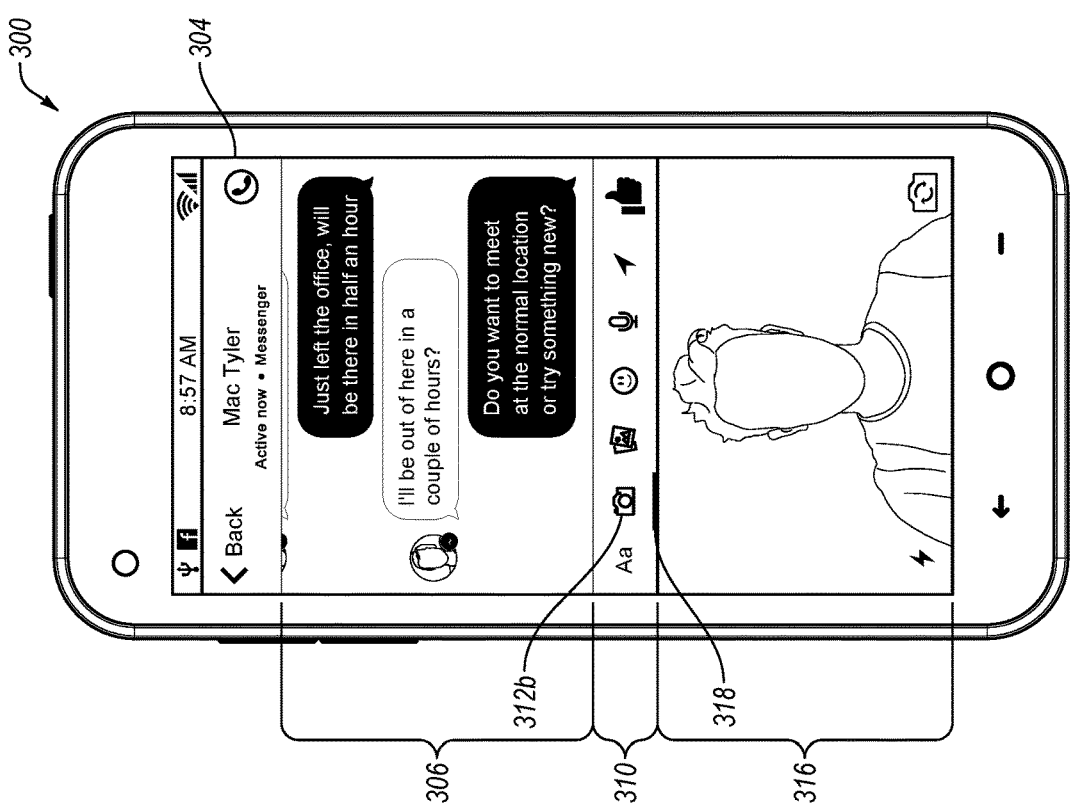
*Fig. 4C*
*Fig. 4D*

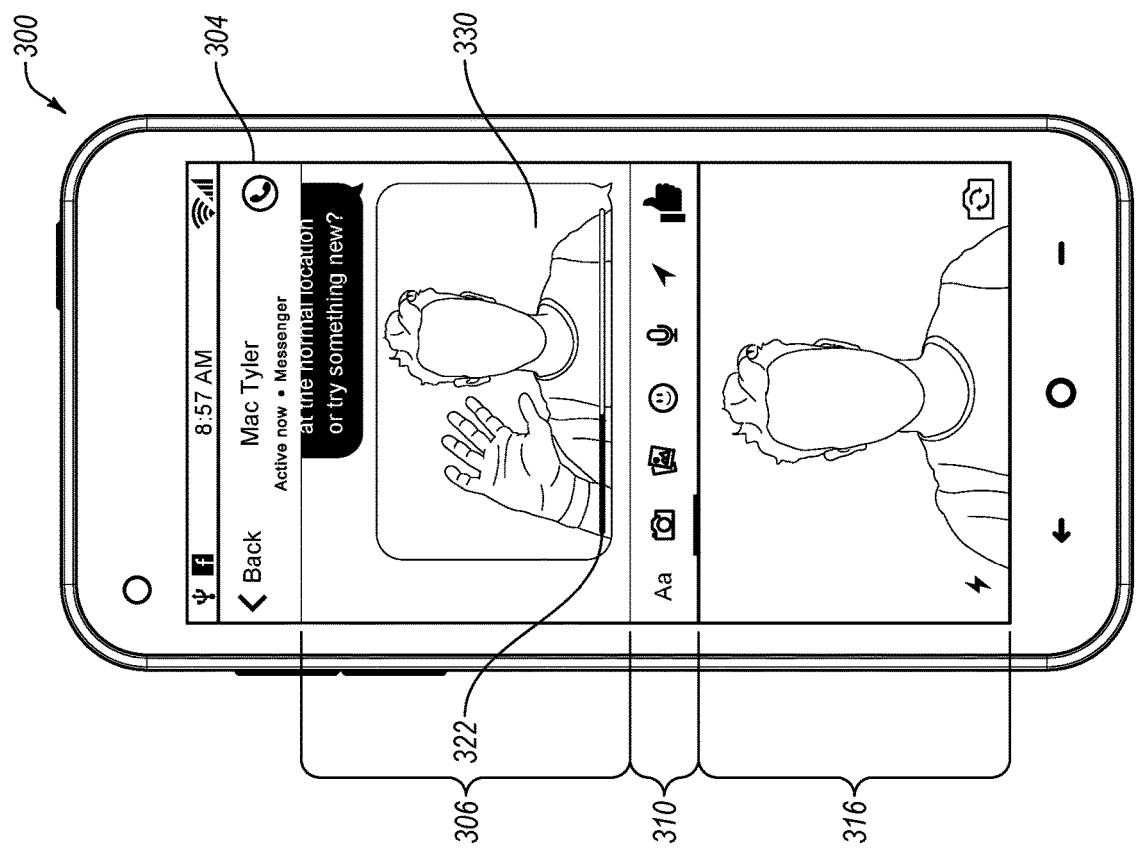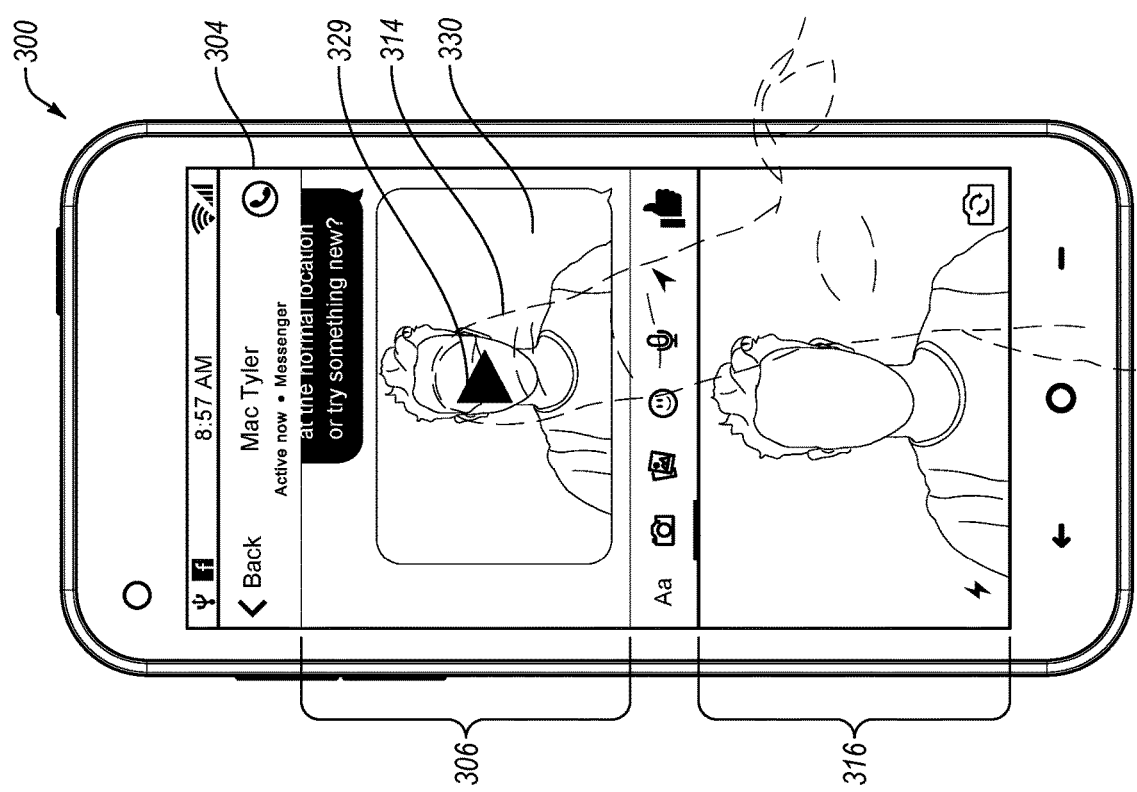

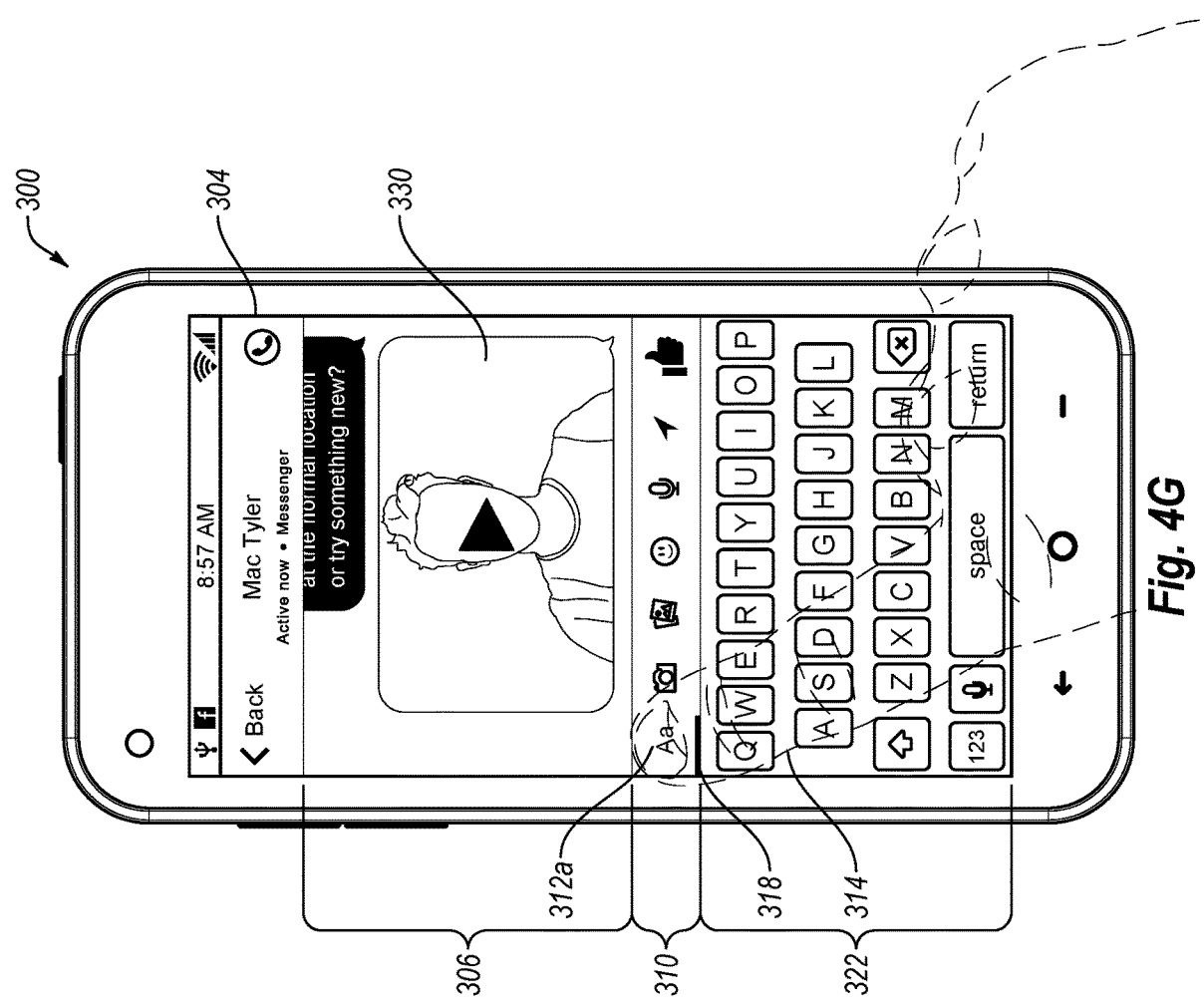

CAPTURING AND SENDING MULTIMEDIA AS ELECTRONIC MESSAGES

CROSS REFERENCE TO RELATED APPLICATIONS

The present application is a continuation of U.S. application Ser. No. 15/191,157, filed Jun. 23, 2016, which is a continuation of U.S. application Ser. No. 14/314,623, filed Jun. 25, 2014 which issued as U.S. Pat. No. 9,391,934, which claims priority to and the benefit of U.S. Provisional Application No. 61/985,456 filed Apr. 28, 2014. The entire contents of the foregoing application are hereby incorporated by reference in their entirety.

BACKGROUND

1. Technical Field

One or more embodiments relate generally to electronic messaging systems and methods. More specifically, one or more embodiments relate to systems and methods for increasing functionality in an electronic messaging system.

2. Background and Relevant Art

Computing devices (e.g., computers, tablets, and smart phones) provide numerous ways for people to connect and communicate with one another. For example, a variety of electronic messaging systems provide various methods to send and receive electronic messages. For instance, a computing device can allow a user to communicate with other users using text messaging, instant messaging, social network posting, and other forms of electronic communication. In addition, an electronic communication may include a variety of content including text, images, video, audio, and/or other multimedia. In general, electronic communication has become a popular way for people to connect and communicate with one another.

Including multimedia in electronic communications has become an especially popular way to add humor, context, and information to an electronic communication session. For example, a user may send a digital photograph to a co-user indicating his location. Similarly, a user may send a video laughing in response to an electronic message that includes a joke. Thus, including multimedia is an easy way to add a layer of expression to an electronic communication session that is typically difficult with only textual electronic messages.

Conventional processes for including multimedia in an electronic communication are generally problematic. For example, a user typical navigates away from an electronic communication interface in order to capture a digital photograph or video for inclusion in an electronic communication session. Navigating away from the electronic communication interface, however, can cause a user to miss messages or otherwise make adding a multimedia content item time consuming and frustrating for a user.

Additionally, capturing a multimedia content item and including the multimedia content item in an electronic communication is a process that typically includes multiple user interactions. For example, generally a user interacts with a user interface in order to transition from an electronic communication interface to a camera viewfinder interface. More user interactions are generally required to capture the multimedia content item (i.e., photograph or video), transition back to the electronic communication interface, and finally send the multimedia content item to a co-user as part of an electronic communication. The multiple user interactions typically needed to capture multimedia and include the captured multimedia in an electronic communication add extra steps and hassle to the process of composing an electronic communication.

Thus, there are several disadvantages to current methods for capturing and sending multimedia in a messaging application.

SUMMARY

One or more embodiments provide benefits and/or solve one or more of the foregoing or other problems in the art with methods and systems that provide enhanced features for electronic messaging systems. For example, methods and systems described herein allow users greater functionality for including multimedia content items in an electronic communication session. Furthermore, one or more embodiments can provide the foregoing or other benefits easily and intuitively through a single user interface of the electronic messaging system.

In addition to the foregoing, systems and methods of one or more embodiments allow a user to capture electronic multimedia without transitioning away from the electronic messaging system. For example, in one or more embodiments, a user interface of the electronic messaging system displays both a communication thread with electronic messages sent between co-users and a camera viewfinder allowing a user to frame and capture electronic multimedia (e.g., a photograph or video). Thus, a user may capture electronic multimedia without navigating away from the communication thread.

Furthermore, systems and methods of one or more embodiments allow a user to capture electronic multimedia without requiring surplus user interactions. For example, in one or more embodiments, a user may send electronic multimedia (i.e., a photograph or video) automatically upon capturing the electronic multimedia. Thus, one or more embodiments can foster spontaneous, speedy, unrehearsed or edited communication.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments of the invention will be described and explained with additional specificity and detail through the use of the accompanying drawings in which:

FIGS. 3A-3E illustrate user interfaces for capturing and sending a multimedia content item in accordance with one or more embodiments;

FIGS. 4A-4G illustrate user interfaces for capturing and sending a multimedia content item in accordance with one or more embodiments;

DETAILED DESCRIPTION

One or more embodiments include an electronic messaging system that provides users with efficient and effective user experiences when sending multimedia content items as electronic messages. More specifically, one or more embodiments described herein allow users to easily and intuitively create multimedia content items for sending as an electronic message. In particular, the electronic messaging system described herein can allow a user to quickly and easily create and send a digital photograph or digital video as a message.

Furthermore, the electronic messaging system can allow a user to create a digital photograph or digital video without navigating away from a communication thread. For example, one or more embodiments provide a user interface containing a communication thread as well as a camera viewfinder. Thus, one or more embodiments allow a user to capture multimedia while simultaneously receiving and reading messages.

Furthermore, systems and methods of one or more embodiments allow a user to capture electronic multimedia without requiring surplus user interactions. For example, the electronic messaging system may capture different types of multimedia via the camera viewfinder in response to different types of user input. Additionally, the electronic messaging system may capture a digital photograph via the camera viewfinder in response to a detected tap touch gesture. Additionally, the electronic messaging system may capture a digital video via the camera viewfinder in response to a detected press-and-hold touch gesture.

One or more embodiments automatically add the captured multimedia to the communication thread immediately upon completion of the user interaction used to capture the multimedia. For example, the electronic messaging system may add a captured digital photograph to the communication thread immediately following a detected tap touch gesture used to capture the digital photograph. Additionally, the electronic messaging system may add a captured digital video to the communication thread immediately upon a detected release of a press-and-hold touch gesture used to capture the digital video. Thus, one or more embodiments can foster spontaneous, speedy, unrehearsed or edited communication.

Figure 1:
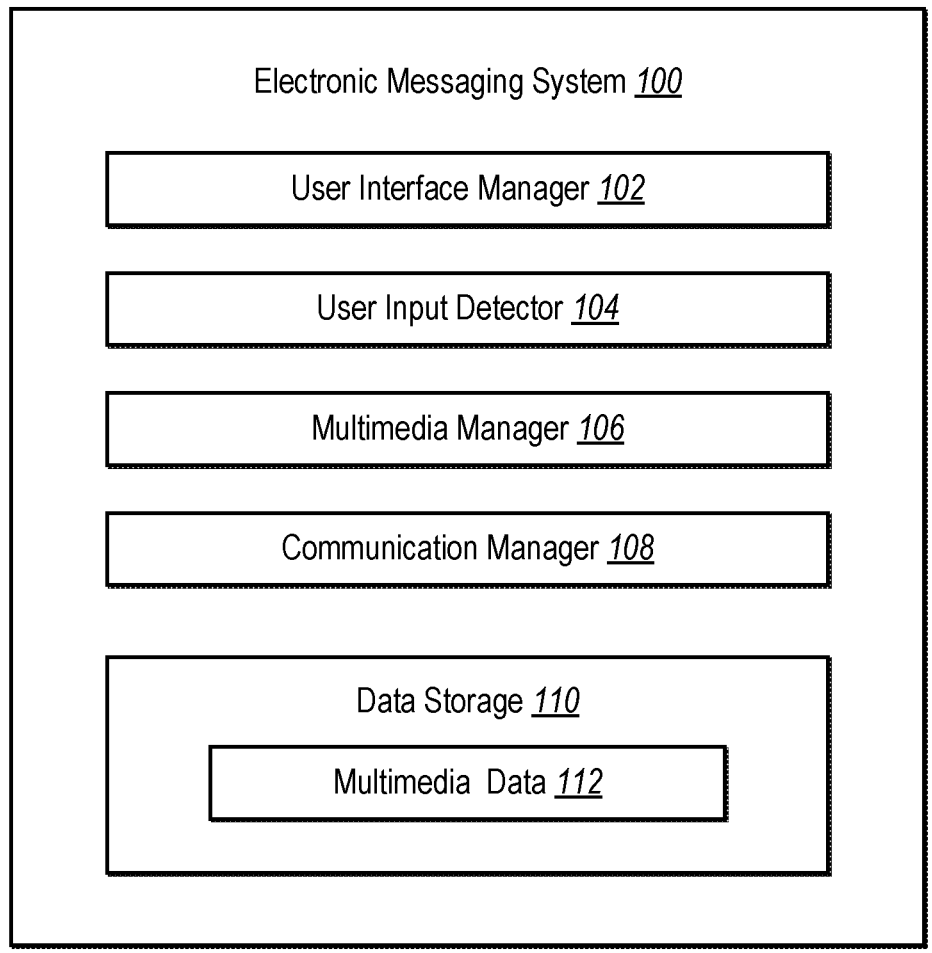
FIG. 1 illustrates a schematic diagram of an electronic messaging system in accordance with one or more embodiments.

FIG. 1 illustrates an example embodiment of an electronic messaging system 100. As shown, the electronic messaging system 100 may include, but is not limited to, a user interface manager 102 (or simply "UI manager"), a user input detector 104, a multimedia manager 106, a communication manager 108, and a data storage 110. Each of the components 102-110 of the electronic messaging system 100 may be in communication with one another using any suitable communication technologies. Although the disclosure herein shows the components 102-110 to be separate in FIG. 1, any of the components 102-110 may be combined into fewer components, such as into a single facility or module, or divided into more components as may serve one or more embodiments. In addition, the components 102-110 may be located on, or implemented by, one or more computing devices, such as those described below in relation to FIG. 7. Alternatively, portions of the electronic messaging system 100 can be located on a computing device, while other portions of the electronic messaging system 100 are located on, or form part of, a social networking system, such as that described below in reference to FIG. 8.

The components 102-110 can comprise software, hardware, or both. For example, the components 102-110 can comprise one or more instructions stored on a computer readable storage medium and executable by a processor of one or more computing devices. When executed by the one or more processors, the computer-executable instructions of the electronic messaging system 100 can cause a computing device(s) to perform the methods described herein. Alternatively, the components 102-110 can comprise hardware, such as a special-purpose processing device to perform a certain function. Additionally or alternatively, the components 102-110 can comprise a combination of computer-executable instructions and hardware.

As mentioned above, and as shown in FIG. 1, the electronic messaging system 100 can include a user interface manager 102. The user interface manager 102 provides, manages, updates, and/or controls graphical user interfaces (or simply "user interfaces") that allow a user to view and interact with display elements. For example, the user interface manager 102 may identify, display, update, or otherwise provide various user interfaces that contain one or more display elements in various layouts.

More specifically, the user interface manager 102 can display a variety of display elements within a graphical user interface. For example, the user interface manager 102 may display a graphical user interface on a display of a computing device. For instance, display elements include, but are not limited to: buttons, text boxes, menus, thumbnails, scroll bars, hyperlinks, etc. In one or more embodiments, the user interface manager 102 can display and format display elements in any one of a variety of layouts.

Furthermore, the user interface manager 102 can also update, remove, resize, or reposition display elements in response to user interactions. For example, as will be described in more detail below, the electronic messaging system 100 may detect user input in a variety of ways. For instance, in one or more embodiments, the detected user input may cause the user interface manager 102 to update a graphical user interface based on the detected input. Similarly, in one or more embodiments, the detected user input may cause the user interface manager 102 to resize one or more display elements, to reposition one or more display elements within the graphical user interface, or to otherwise change or remove one or more display elements within the graphical user interface.

Additionally, the user interface manager 102 can selectively update certain areas of a user interface in response to user interactions. For example, in one or more embodiments, detected user input may cause the user interface manager 102 to update or change within only one area of a graphical user interface. In one or more embodiments, upon a detected user interaction, the user interface manager 102 may update one area within a user interface from one type of display to a second type of display, while continuing to display another area within the user interface with no updates.

Along similar lines, the user interface manager 102 can reorganize a user interface in response to user interactions. For example, in one or more embodiments, detected user input may cause the user interface manager 102 to split a graphical user interface into two or more areas. In one or more embodiments, upon a detected user interaction, the user interface manager 102 may reorganize a user interface from only displaying one area with a first collection of display elements to displaying two areas with the first collection of display elements in the first area and a second collection of display elements in the second area. Likewise, in one or more embodiments, the user interface manager 102 may also consolidate or remove areas within a graphical user interface in response to detected user interactions.

As mentioned above, and as illustrated in FIG. 1, the electronic messaging system 100 may further include a user input detector 104. The user input detector 104 detects, receives, and/or facilitates user input in any suitable manner. In some examples, the user input detector 104 detects one or more user interactions. As referred to herein, a "user interaction" means a single input, a combination of inputs, received from a user by way of one or more input devices, or via one or more touch gestures. A user interaction can have variable duration and may take place anywhere on the graphical user interface managed by the user interface manager 102 described above.

For example, the user input detector 104 can detect a user interaction from a keyboard, mouse, touch screen display, or any other input device. In the event a touch screen display is utilized, the user input detector 104 can detect one or more touch gestures that form a user interaction (e.g., tap gestures, swipe gestures, pinch gestures, etc.) provided by a user by way of the touch screen. In one or more embodiments, the user input detector 104 can detect touch gestures in relation to and/or directed at one or more display elements displayed as part of the graphical user interface presented on the touch screen display. The user input detector 104 may report any detected touch gesture in relation to and/or directed at one or more display elements to user interface manager 102.

The user input detector 104 may additionally, or alternatively, receive data representative of a user interaction. For example, the user input detector 104 may receive one or more user configurable parameters from a user, one or more user commands from the user, and/or any other suitable user input. For example, the user input detector 104 can receive voice commands or otherwise sense, detect, or receive user input.

As mentioned above, and as illustrated in FIG. 1, the electronic messaging system 100 may further include a multimedia manager 106. The multimedia manager 106 captures, packages, and stores multimedia inputs for inclusion in a communication session. For example, in one or more embodiments, the multimedia manager 106 can interface with one or more cameras of a computing device. For example, in response to a detected input, the multimedia manager 106 may capture multimedia via the one or more cameras and create an accompanying multimedia content item.

For example, in one or more embodiments, the multimedia manager 106 may interface with at least one camera of a computing device and provide a camera viewfinder to the user interface manager 102. In one or more embodiments, the user interface manager 102 may display the provided camera viewfinder as part of a user interface including a communication thread. Thus, in one or more embodiments, the user interface manager 102 may simultaneously display the camera viewfinder and communication thread.

Additionally, the multimedia manager 106 may capture multimedia via the camera viewfinder in response to a detected user input. For example, the multimedia manager 106 may capture an image in response to a detected tap touch gesture, and create a digital photograph multimedia content item containing the image. Also, the multimedia manager 106 may capture a video in response to a detected press-and-hold touch gesture, and create a digital video multimedia content item. In one or more alternative embodiments, the multimedia manager 106 may capture and create other types of multimedia in response to other types of detected inputs. For example, the multimedia manager 106 may capture a dozen rapid images in burst mode in response to a double tap touch gesture, or may capture only audio in response to a two-finger press-and-hold touch gesture, etc.

The multimedia manager 106 may also add a captured multimedia content item to a communication thread. For example, in one or more embodiments, upon a detected completion of a user interaction used to capture the multimedia, the multimedia manager 106 may add the multimedia content item to the communication thread. For instance, in one or more embodiments, the multimedia manager 106 may add a digital photograph to the communication thread immediately upon completion of a detected tap touch gesture used to capture the digital photograph without further user action. Similarly, in one or more embodiments, the multimedia manager 106 may add a digital video to the communication thread immediately upon completion of a detected press-and-hold touch gesture used to capture the digital video. Thus, in response to the same (and in one or more embodiments a single) user interaction, the multimedia manager 106 can capture a multimedia content item, sent the multimedia item as an electronic message, and add the multimedia content item to a communication thread.

In one or more embodiments, the multimedia manager 106 may package the multimedia content item for display once it is has been added to the communication thread. For example, the multimedia manager 106 may package a digital video multimedia content item into a playback control capable of playing the digital video multimedia. The multimedia manager 106 may then add the playback control with the packaged digital video multimedia content item to the communication thread. Thus, the multimedia manager 106 can allow the digital video to be played directly from the communication thread, rather than from a third party multimedia player.

Additionally, the multimedia manager 106 may cancel or delete a multimedia content item prior to adding the multimedia content item to the communication thread. For example, in one or more embodiments, the multimedia manager 106 may cancel the capture of a digital photograph or digital video in response to a detected user interaction.

For instance, the multimedia manager 106 may cancel the capture of a digital video in response to a detected swipe. In this case, the multimedia manager 106 discards any portion of the digital video or image that has already been captured and does not send a message or add anything to the communication thread.

Furthermore, the multimedia manager 106 may store the multimedia content items captured via the camera viewfinder. For example, in one or more embodiments, the multimedia manager 106 may store a captured multimedia content item in the file storage of a computing device after sending and adding the multimedia content item to the communication thread. Thus, the captured multimedia content item may be later accessed by the electronic messaging system, or by another third party system. In one or more alternative embodiments, the multimedia manager 106 may immediately discard the captured multimedia content item after sending and adding the multimedia content item to the communication thread. Additionally, the multimedia manager 106 may receive a user configuration specifying whether to store or discard captured multimedia content items.

The multimedia manager 106 may also provide options for adding effects to captured multimedia content items. For example, in one or more embodiments, the multimedia manager 106 may provide a variety of effects that may be added to captured multimedia content items such as, but not limited to: color effects (i.e., black and white, sepia, color, etc.), overlay effects (i.e., add a border, add a caption, etc.), sharpness and contrast effects, facial recognition and tagging effects, or any other effects suitable for multimedia content items. In one or more embodiments, the multimedia manager 106 may accept a configuration regarding added effects prior to capturing a multimedia content item, sending the multimedia content item as a message, and adding the captured multimedia content item to the communication thread.

As mentioned above, and as illustrated in FIG. 1, the electronic messaging system 100 may further include a communication manager 108. The communication manager 108 can facilitate receiving and sending data to and from the electronic messaging system 100, or a computing device upon which the electronic messaging system 100 is implemented. In particular, the communication manager 108 can instruct or activate one or more communication interfaces of a computing device, as described below to send or receive data, particularly data related to electronic communications. Furthermore, the communication manager 108 can package or format content items to be sent or received from the electronic messaging system 100 in any necessary form that is able to be sent through one or more communication channels and using an appropriate communication protocol, as described further below with reference to FIG. 7.

Furthermore, the communication manager 108 may automatically send, to one or more co-users, captured multimedia provided by the multimedia manager 106. For example, in one or more embodiments, in response to a detected completion of a user interaction and without further user interaction, the communication manager 108 may send captured multimedia content item to one or more co-users of the communication system. In this way, the electronic messaging system 100 can foster spontaneous, real-time communication. This is in contrast to systems that require a user-initiated send event prior to sending a multimedia content item. In alternative embodiments, the communication manager 108 can send a message upon a user selecting a send option.

As discussed above, the electronic messaging system 100 can include a data storage 110, as illustrated in FIG. 1. The data storage 110 may maintain multimedia data 112 representative of data associated with multimedia content items. For example, the multimedia data 112 may include, but is not limited to: captured multimedia content items, multimedia effect options and configurations, and multimedia storage options and configurations.

Figure 2:
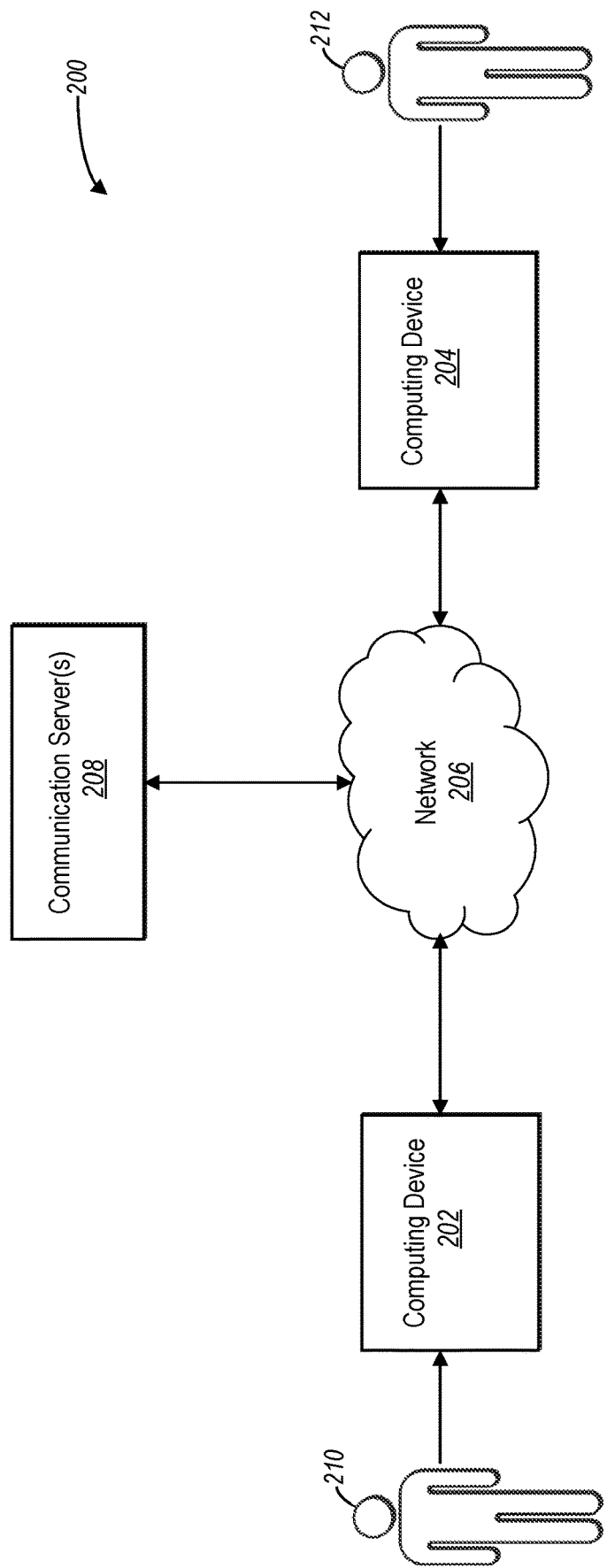
FIG. 2 illustrates a block diagram of an environment for implementing the system of FIG. 1 in accordance with one or more embodiments.

FIG. 2 is a schematic diagram illustrating an example system 200, within which one or more embodiments of the electronic messaging system 100 can be implemented. As illustrated in FIG. 2, the system 200 can include computing devices 202, 204, a network 206, and a communication server 208. The computing devices 202, 204, the network 206, and the communication server 208 may be communicatively coupled, as shown in FIG. 2. Although FIG. 2 illustrates a particular arrangement of the computing devices 202, 204, the network 206, and the communication server 208, various additional arrangements are possible. For example, the computing devices 202, 204 may directly communicate with the communication server 208, bypassing the network 206, or alternatively, may directly communicate with each other.

The computing devices 202, 204, the network 206, and the communication server 208 may communicate using any communication platforms and technologies suitable for transporting data and/or communication signals. For example, the computing devices 202, 204, the network 206, and the communication server 208 may communicate via any known communication technologies, devices, media, and protocols supportive of remote data communications, examples of which will be described in more detail below with respect to FIG. 7. In addition, in certain embodiments, the computing devices 202, 204, and the communication server 208 may communicate via the network 206, which may include one or more social networks as described further below with respect to FIG. 8.

The communication server 208 may generate, store, receive, and transmit electronic communication data. For example, the communication server 208 may receive an electronic communication from the computing device 202 and send the received electronic communication to the computing device 204. In particular, the communication server 208 can transmit electronic messages between one or more users of the system 200. The communication server 208 can receive a wide range of electronic communication types, including but not limited to, text messages, instant messages, social-networking messages, social-networking posts, emails, and any other form of electronic communication. Additional details regarding the communication server 208 will be discussed below with respect to FIG. 7.

The network 206 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 206 may be any suitable network over which the computing device 202 may access the communication server 208 and/or the computing device 204, or vice versa. The network 206 will be discussed in more detail below with regard to FIGS. 7 and 8.

In addition to the system and network elements of the system 200, FIG. 2 illustrates that a user 210 can be associated with the computing device 202, and that a user 212 can be associated with the computing device 204. Although FIG. 2 illustrates only two users 210, 212, the system 200 can include a large number of users, with each of the users interacting with the system 200 through one or more computing devices. For example, the user 210 can interact with the computing device 202 for the purpose of composing, and sending an electronic communication (e.g., instant message). The user 210 may interact with the computing device 202 by way of a user interface, managed by the user interface manager 102, on the computing device 202. For example, the user 210 can utilize the user interface to cause the computing device 202 to compose and send an electronic communication to one or more of the plurality of users of the system 200.

In one or more embodiments, the components 102-110, as described with regard to FIG. 1, may be implemented on one or more of the computing devices 202, 204 and the communication server 208. For example, the computing devices 202, 204, and the communication server 208 may communicate across the network 206 via the communication manager 108 of the electronic messaging system 100. In one or more embodiments, the computing devices 202, 204 may receive user inputs via the user input detector 104. Likewise, in one or more embodiments, the computing devices 202, 204 may provide graphical user interfaces via the user interface manager 102. Furthermore, in one or more embodiments each of the computing devices 202, 204 can include an instance of the electronic messaging system 100.

As will be described in more detail below, each of the components 100-110 of the electronic messaging system 100 as described with regard to FIGS. 1 and 2, can provide, along and/or in combination with the other components of the electronic messaging system 100, one or more graphical user interfaces. In particular, the components 102-110 can allow a user to interact with a collection of display elements for a variety of purposes. In particular, FIGS. 3A-4G and the description that follows illustrate various example embodiments of the user interfaces and features that are in accordance with general principles as described above.

In some examples, a computing device (i.e., computing device 202, 204 of FIG. 2) can implement part or all of the electronic messaging system 100. For example, FIG. 3A illustrates a computing device 300 that may implement one or more of the components 102-110 of the electronic messaging system 100. As illustrated in FIG. 3A, the computing device 300 is a handheld device, such as a mobile phone device (e.g., a smartphone). As used herein, the term "handheld device" refers to a device sized and configured to be held/operated in a single hand of a user. In additional or alternative example, however, any other suitable computing device, such as, but not limited to, a tablet device, a handheld device, larger wireless devices, laptop or desktop computer, a personal-digital assistant device, and/or any other suitable computing device can perform one or more of the processes and/or operations described herein.

The computing device 300 can include any of the features and components described below in reference to a computing device 700 of FIG. 7. As illustrated in FIG. 3A, the computing device 300 includes a touch screen display 302 that can display or provide user interfaces and by way of which user input may be received and/or detected. As used herein, a "touch screen display" refers to the display of a touch screen device. In one or more embodiments, a touch screen device may be a computing device 202, 204 with at least one surface upon which a user 210, 212 may perform touch gestures (e.g., a laptop, a tablet computer, a personal digital assistant, a media player, a mobile phone). Additionally or alternatively, the computing device 300 may include any other suitable input device, such as a touch pad or those described below in reference to FIG. 7.

FIG. 3A illustrates a touch screen display 302 of the computing device 300 displaying one embodiment of a graphical user interface, in particular a messaging graphical user interface 304. For example, the user interface manager 102 provides various display areas and display elements as part of the messaging graphical user interface 304. In one or more embodiments, the user interface manager 102 provides a communication thread 306, as well as a message input control palette or toolbar 310.

As described above, the communication manager 108 of the electronic messaging system 100 can facilitate receiving and sending data. In one or more embodiments, the communication manager 108 facilitates receiving and sending electronic communications between the computing devices 202, 204. Also in one or more embodiments, the user interface manager 102 displays electronic communications sent and received via the communication manager 108. In one or more embodiments, the user interface manager 102 can display electronic communications sent and received via the communication manager 108 in the communication thread 306 within the messaging graphical user interface 304.

For example, as illustrated in FIG. 3A, the user interface manager 102 provides the communication thread 306 that includes electronic messages 308a sent from an account of a user of the communication device 300. Similarly, the communication thread 306 can include electronic messages 308b received by the account of the user of the computing device 300. In one or more embodiments, the user interface manager 102 organizes the communication thread 306 such that new messages are added to the bottom of the communication thread 306 so that older messages are displayed at the top of the communication thread 306. In alternative embodiments, the user interface manager 102 may organize the messages 308a, 308b in any manner that may indicate to a user the chronological or other relationship between the messages 308a, 308b.

The user interface manager 102 provides a variety of electronic communication characteristics to help a user distinguish between electronic communications in the communication thread 306. For example, as illustrated in FIG. 3A, the user interface manager 102 displays the electronic messages 308a sent from an account of the user of the computing device 300 pointed toward one side (i.e., the right side) of the messaging graphical user interface 304. On the other hand, the user interface manager 102 displays the electronic messages 308b received by the communication manager 108 pointed toward the opposite side (i.e., the left side) of the messaging graphical user interface 304. In one or more embodiments, the positioning and orientation of the electronic messages 308a, 308b provides a clear indicator to a user of the computing device 300 of the origin of the various electronic communications displayed within the messaging graphical user interface 304.

Another characteristic provided by the user interface manager 102 that helps a user distinguish electronic communications may be a color of the electronic communications. For example, as shown in FIG. 3A, the user interface manager 102 displays sent electronic messages 308a in a first color and received electronic messages 308b in a second color. In one or more embodiments, the first and second colors may be black and white, respectively, with an inverted typeface color. In an alternative embodiment, the user interface manager 102 may display the electronic messages 308a, 308b with white backgrounds and different colored outlines.

In yet another alternative embodiment, the user interface manager 102 may display the electronic messages 308a, 308b with backgrounds of different patterns, in different fonts, in different sizes or in any other manner that may distinguish the sent electronic messages 308a from the received electronic messages 308b. For example, in one or more embodiments, the user interface manager 102 displays sent electronic messages 308a with white typeface on a blue background. Likewise, in one or more embodiments, the user interface manager 102 displays received electronic messages 308b with black typeface on a grey background.

As mentioned above, the user interface manager 102 may also provide a message input control palette or toolbar 310. As illustrated in FIG. 3A, the user interface manager 102 displays the message input control palette or toolbar 310 as part of the messaging graphical user interface 304. In one or more embodiments, the message input control palette or tool bar 310 includes a variety of selectable message input controls that provide a user with various message input options or other options. For example, in FIG. 3A, the message input control palette or toolbar 310 includes a text input control 312a, a camera viewfinder input control 312b, a multimedia input control 312c, a symbol input control 312d, and a sound input control 312e. In one or more alternative embodiments, the message input control palette or toolbar 310 may provide the input controls 312a-312e in a different order, may provide other input controls not displayed in FIG. 3A, or may omit one or more of the input controls 312a-312e shown in FIG. 3A.

As will be described below in greater detail, a user may interact with any of the input controls 312a-312e in order to compose and send different types of electronic communications. For example, if a user interacts with the text input control 312a, the user interface manager 102 may provide a touch screen display keyboard in a portion of the messaging graphical user interface 304 that the user may utilize to compose a textual message. Similarly, if a user interacts with the multimedia input control 312c, the user interface manager 102 may provide a multimedia content item display area (e.g., for displaying digital photographs, digital videos, etc.) within a portion of the messaging graphical user interface 304. Furthermore, if a user interacts with the sound input control 312e, the user interface manager 102 may provide a sound recording control by way of which the user can record a voice or other sound message. Likewise, as will be described in more detail below, if a user interacts with the camera viewfinder input control 312b, the user interface manager 102 may provide a digital camera interface within a portion of the messaging graphical user interface 304 that the user may utilize to capture, send, and add a digital photograph or digital video to the communication thread 306.

A user may interact with any of the message input controls 312a-e in order to compose and send a message to one or more co-users via the electronic messaging system 100. For example, in FIG. 3B, a user's finger 314 is shown interacting with the camera viewfinder input control 312b. In one or more embodiments, the user input detector 104 can detect interactions (e.g., a tap touch gesture) of the user's finger 314 with the camera viewfinder input control 312b. The user interface manager 102 may display an input control indicator 318 to indicate which input control 312a-e is currently active. Additionally, as shown in FIG. 3B, upon the user input detector 104 detecting a tap touch gesture on the camera viewfinder input control 312b, the user interface manager 102 may display a camera viewfinder 316. In other words, in response to the detected user interaction the electronic messaging system 100 can activate a camera of the computing device 300 and display within the camera viewfinder 316 a data (image/video) stream from the camera of the computing device 300.

In particular, as illustrated by FIG. 3B, the user interface manager 102 can provide the communication thread 306 in a first portion (i.e., the upper portion) of the messaging user interface 304. The user interface manager 102 can provide the camera viewfinder 316 in a second portion (i.e., the lower portion) of the messaging user interface 304. Thus, the user interface manager 102 can allow the user to view the communication thread 306 and any new messages, while also being able to view and capture multimedia. In alternative embodiments the user interface manager 102 can arrange the communication thread 306 and the camera viewfinder 316 horizontally or in another arrangement other than a vertical arrangement.

In one or more embodiments, the multimedia manager 106 may interface with one or more cameras of the computing device 300 and may provide the camera viewfinder 316 based on the one or more cameras of the computing device 300. For example, in one or more embodiments, the computing device 300 may include a back facing camera that faces away from a user. In one or more embodiments, the multimedia manager 106 may interface with the back facing camera and provide images captured by the back facing camera within the camera viewfinder 316. In one or more alternative embodiments, the computing device 300 may include a back facing camera as well as a front facing camera (i.e., a camera that faces the user). In another embodiment, the multimedia manager 106 may interface with either the back facing camera or the front facing camera and provide the same image viewed by either the back facing camera or the front facing camera within the camera viewfinder 316.

For example, as shown in FIG. 3B, the multimedia manager 106 may interface with a front facing camera of the computing device 300. Accordingly, the camera viewfinder 316 includes the same image viewed by the front facing camera (i.e., an image of the user). In one or more embodiments, the multimedia manager 106 may continuously update the camera viewfinder 316, such that the image displayed in the camera viewfinder 316 matches the image viewed by the camera the multimedia manager 106. In particular, the multimedia manager 106 may continuously update the camera viewfinder 316 as long as the camera viewfinder input control 312b is active, as indicated by the input control indicator 318.

Figure 3C:
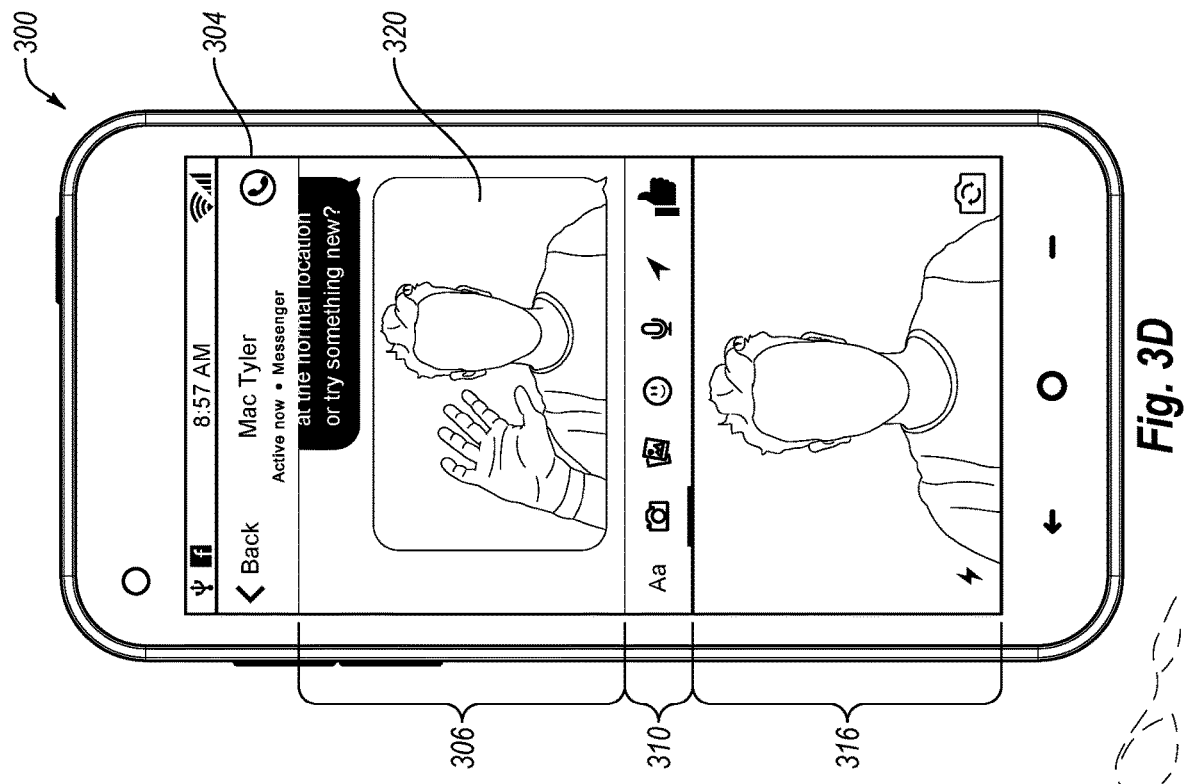

The multimedia manager 106 may capture a multimedia content item via the camera viewfinder 316 in response to a user interaction. For example, as shown in FIG. 3C, the multimedia manager 102 may capture a multimedia content item via the camera viewfinder 316 in response to a detected user interaction on the camera viewfinder. In one or more embodiments, the user input detector 104 may detect a touch gesture of a user's finger 314 with the camera viewfinder 316. In one or more embodiments, the multimedia manager 106 may capture a digital photograph in response to a detected tap touch gesture of the user's finger 314 with the camera viewfinder 316. In one or more alternative embodiments, the multimedia manager 106 may capture a digital photograph in response to another type of user interaction, such as a spoken command, a change in the orientation of the computing device 300 (i.e., portrait to landscape), or another type of user interaction suitable for this purpose.

In one or more embodiments, the communication manager 108 may immediately send the captured multimedia content item to one or more co-users. For example, in one or more embodiments, the multimedia manager 106 may provide a multimedia content item to the communication manager 108 immediately upon the capture of the multimedia content item. Thus, the communication manager 108 may send a captured multimedia content item to one or more co-users immediately following a detected tap touch gesture interacting with the camera viewfinder 316.

Figure 3D:
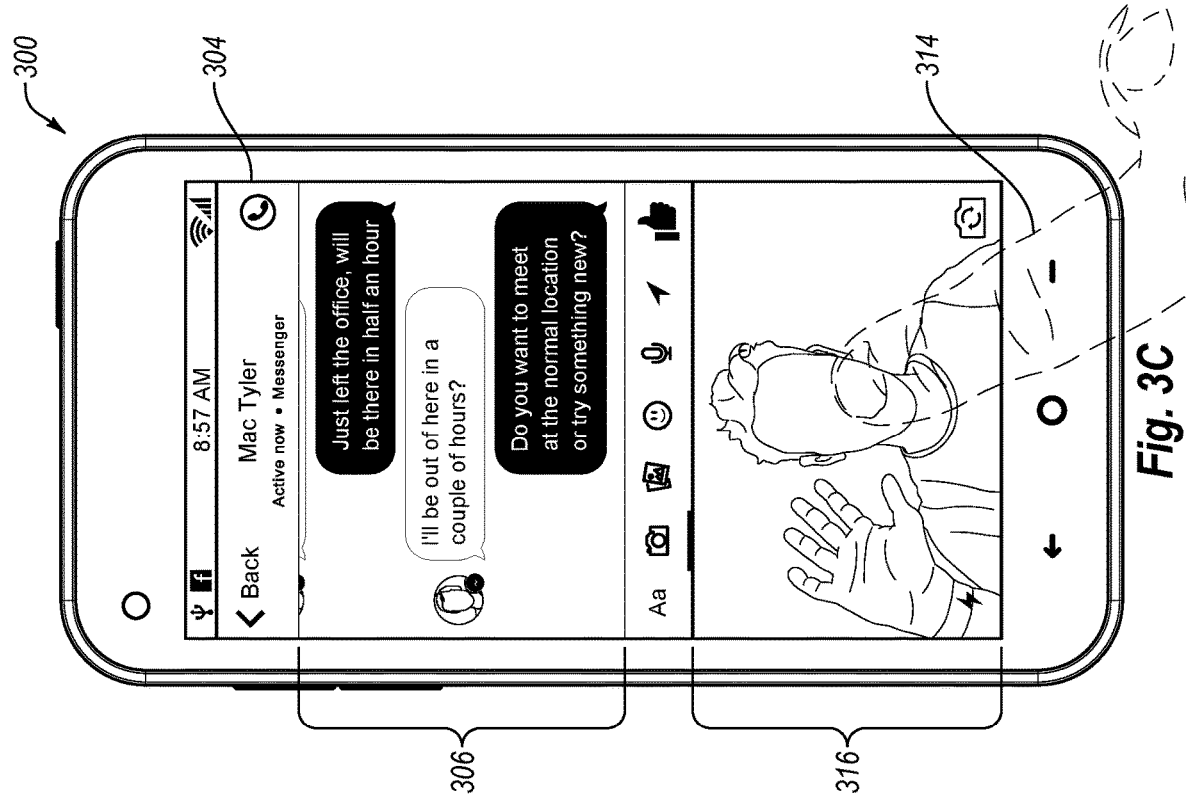

Furthermore, in one or more embodiments, the user interface manager 102 may immediately add the captured multimedia content item to the communication thread 306. For example, as shown in FIG. 3D, the user interface manager 102 can add the captured multimedia content item 320 to the communication thread 306 in response to the detected user interaction described with regard to FIG. 3C. The captured multimedia content item 320 may be a digital photograph captured by the multimedia manager 106 in response to a detected tap touch gesture interaction with the camera viewfinder 316.

Thus, the electronic messaging system 100 can allow a user to capture and send electronic multimedia without requiring surplus user interactions. For example, the electronic messaging system can automatically send the captured multimedia 320 to one or more co-users via the communication server 208 upon capture of the multimedia 320. Furthermore, the electronic messaging system 100 can add the captured multimedia 320 to the communication thread 306 upon capture of the multimedia 320. In other words, the electronic messaging system 100 can capture, send, and add multimedia item 320 to a communication thread 306 in response to a single user interaction (i.e., tap gesture). Thus, one or more embodiments can foster spontaneous, speedy, unrehearsed or edited communication.

As shown in FIG. 3D, when sent to one or more co-users and when added to the communication thread 306, the multimedia content item 320 can have a size configured for display within a communication thread 306. In particular, the multimedia content item 320 can occupy less than the entire communication thread 306 both in a vertical direction and a horizontal direction. By not occupying the total vertical area of the communication thread 306, the communication thread 306 can display both the multimedia content item 320 and one or more messages as shown by FIG. 3D. Along related lines, by not occupying the total horizontal area of the communication thread 306, the multimedia content item 320 can be positioned on one side of the communication thread 306 so as to indicate whether the multimedia content item 320 was a sent or received message.

In one or more embodiments, the multimedia manager 106 may continue to update the camera viewfinder 316 after the multimedia content item 320 has been captured. For example, as shown in FIG. 3D, the multimedia manager 106 can update the camera viewfinder 316 to include a different image than the image of the captured multimedia content item 320. Thus, the user may continue to capture and send multimedia content items with no or little delay from the electronic messaging system 100.

As described above, in one or more embodiments, the multimedia manager 106 may be preconfigured to add certain display effects to the captured multimedia content item 320. For example, in one or more embodiments, a user may preconfigure the multimedia manager 106 to provide the captured multimedia content item 320 in black and white. Additionally or alternatively, the multimedia manager 106 may provide captured multimedia content items with other display effects, such as with enhanced sharpness and clarity, with a border, with a certain color scheme, with a certain image filter, or with any other display effect suitable for multimedia content items. Regardless of the embodiment, the user may preconfigure the multimedia manager 106 to add one or more display effects to captured multimedia content items, such that no user interaction is required between the capture of the multimedia content item and the sending of the captured multimedia content item with the one or more co-users.

FIG. 3D illustrates the multimedia content item 320 added to the communication thread 306 on the device 300 of the user who sent the multimedia content item 320. One will appreciate that when a computing device 204 of a recipient receives the multimedia content item 320, an instance of the electronic messaging system 100 on the recipient computing device 204 can add the multimedia content item 320 to a communication thread 306. In particular, the electronic messaging system 100 on the recipient computing device 204 can add the multimedia content item 320 to a communication thread 306 in a manner similar to that shown in FIG. 3D, albeit on a left side of the communication thread 306. Placement of the multimedia content item 320 on the left side of the communication thread 306 can indicate that the multimedia content item 320 is a received message.

Figure 3E:
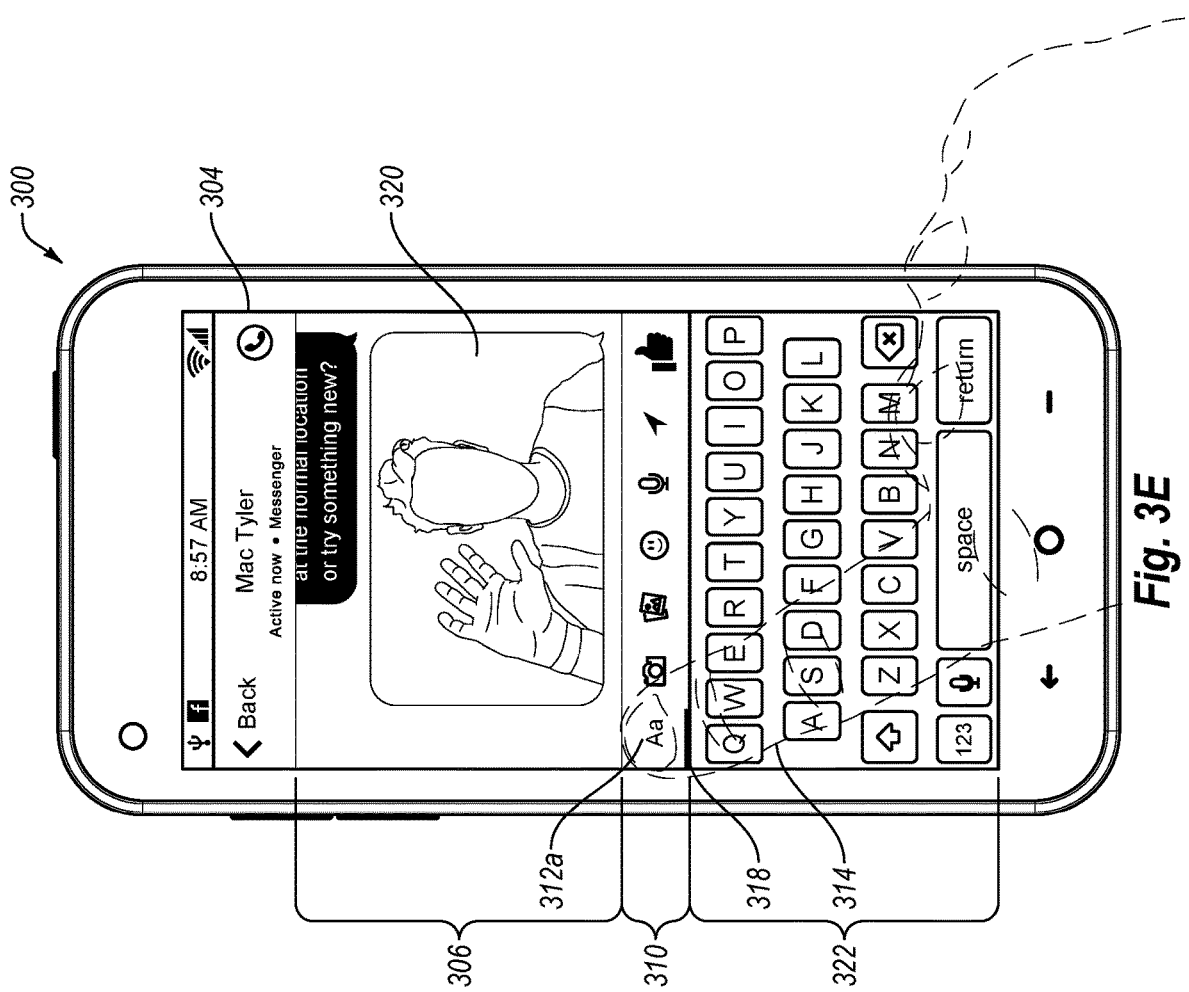

In response to a detected user interaction, the user interface manager 102 may replace the camera viewfinder 316 with another control. For example, as illustrated in FIG. 3E, the user input detector 104 may detect a user interaction of the finger 314 of the user's hand interacting with the text input control 312a within the message input control palette or toolbar 310. In one or more embodiments, in response to the detected selection of the text input control 312a (as indicated by the input control indicator 318), the user interface manager 102 may replace the camera viewfinder 316 with a touch screen display keyboard 322. In one or more alternative embodiments, the user interface manager 102 may replace the camera viewfinder 316 with other types of controls in response to the detected selection of any of the input controls 312a-312b.

FIGS. 3A-3E illustrate a process for capturing and sending a multimedia content item, where the multimedia content item is a digital photograph. In one or more embodiments, the multimedia manager 106 may also capture and send a multimedia content item that is a digital video. For example, as will be illustrated in FIGS. 4A-4G, the multimedia manager 106 may capture a digital video, and provide the digital video to both the communication manager 108 and the user interface manager 102.

As described above, in response to a detected selection of the camera viewfinder input control 312b, the user interface manager 102 may update the messaging graphical user interface 304 to include a camera viewfinder 316 provided by the multimedia manager 106. In one or more embodiments, the user interface manager 102 may update the messaging graphical user interface 304 to include the camera viewfinder 316 such that the messaging graphical user interface 304 still includes the communication thread 306 in one portion of the user interface 304. As described above, in a preferred embodiment, the multimedia manager 106 can continuously update the camera viewfinder 316 to include the most recent image viewed/captured by a camera of the computing device 300.

In response to a detected user interaction, the multimedia manager 106 may capture a multimedia content item via the camera viewfinder 316, wherein the captured multimedia content item is a digital video. For example, the user input detector 104 may detect a user interaction of the user's finger 314 interacting with the camera viewfinder 316, such as a press-and-hold touch gesture. In one or more alternative embodiments, the detected user interaction may be a spoken command, holding the computing device 300 very still for a certain amount of time, or any other type of user interaction suitable for this purpose.

In response to a detected press-and-hold user interaction, the multimedia manager 106 may record a digital video via the camera viewfinder 316. In one or more embodiments, the multimedia manager 106 may also store the recorded digital video on the computing device 300. The multimedia manager 106 can continue to capture and record the digital video via the camera viewfinder 316 during the duration of the detected press-and-hold user interaction.

Figure 4B:
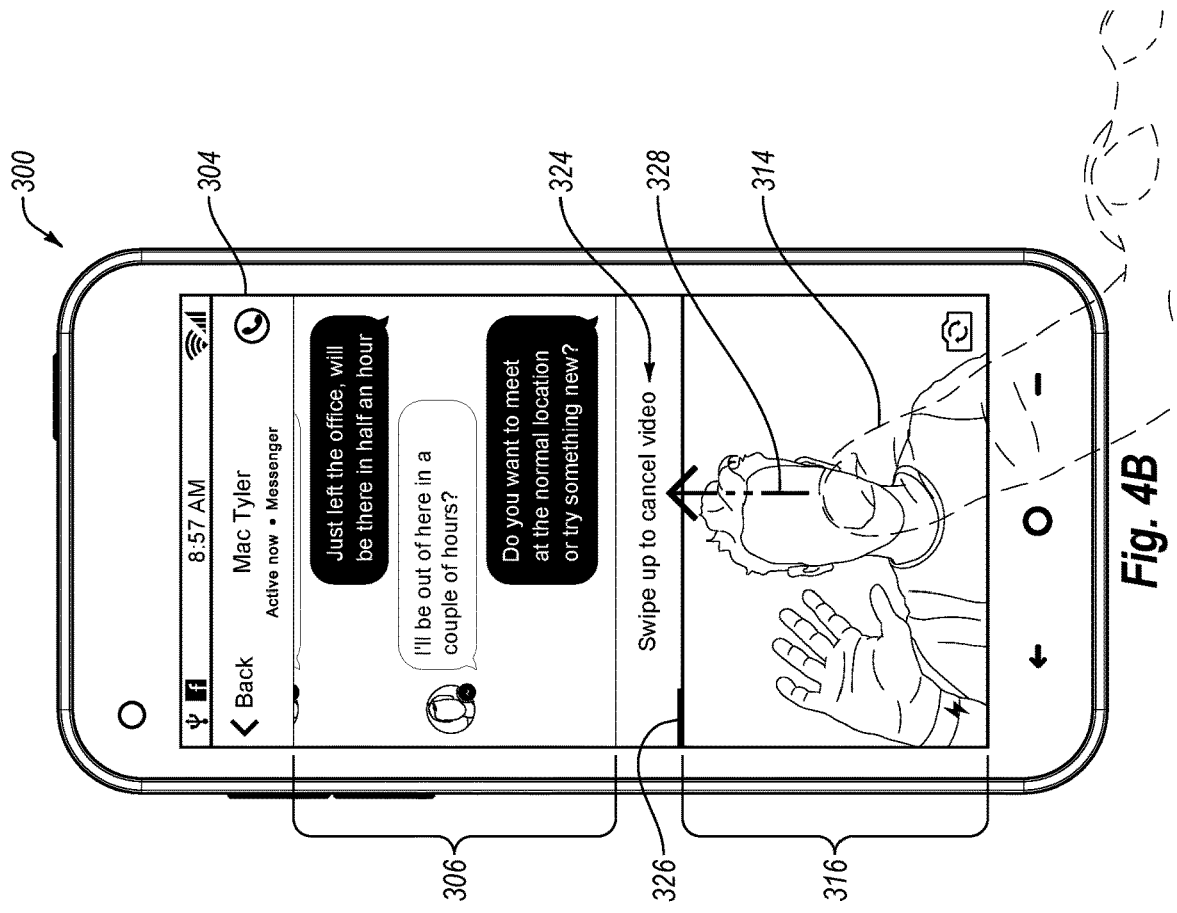
Figure 4A:
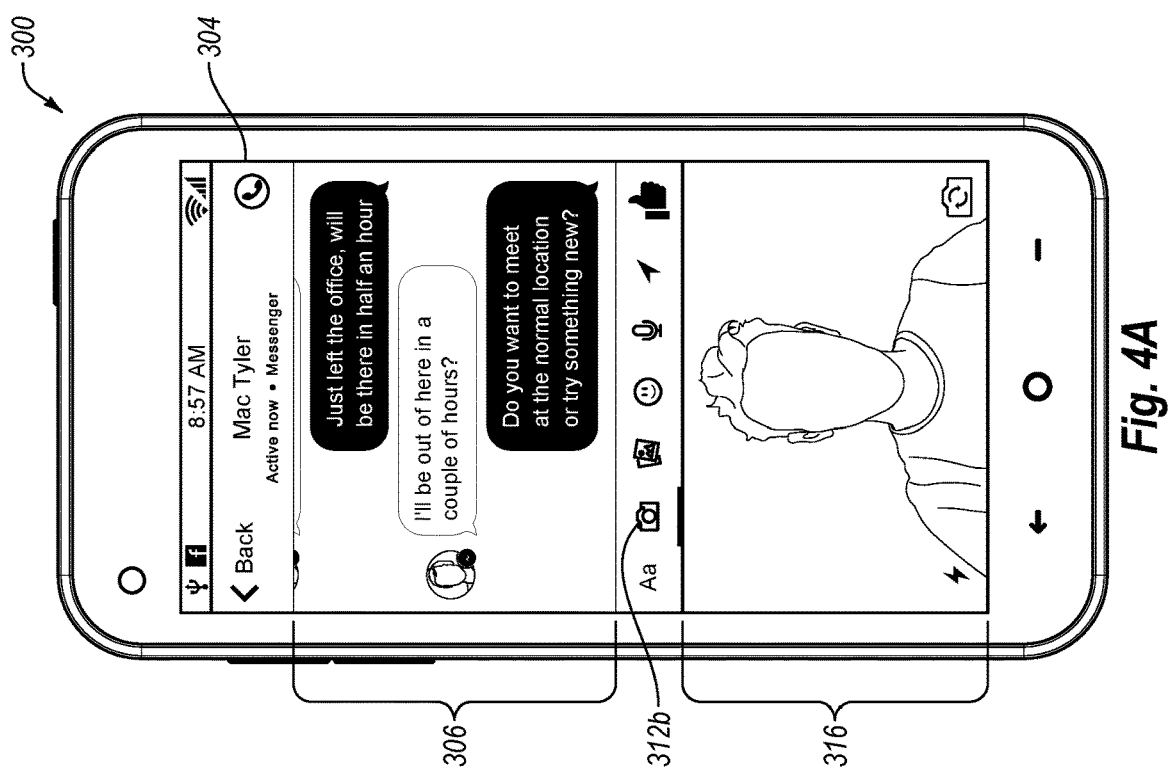

In one or more embodiments, the user interface manager 102 may display one or more instructions regarding the capture of a multimedia content item digital video. For example, as shown in FIG. 4B, the user interface manager 102 can display the instruction 324, which reads, "Swipe up to cancel video." Thus, the instruction 324 informs a user how to cancel the cancel the capture of a digital video. In one or more alternative embodiments, the instruction 324 can give other types of information to the user. For example, in one alternative embodiment, the multimedia manager 106 may determine that the computing device 300 is not still enough to capture a usable digital video. Accordingly, in that alternative embodiment, the user interface manager 102 may cause the instruction 324 to read, "Please hold still."

Additionally, the user interface manager 102 may display an indicator regarding how long the captured digital video is at any given point during the capture of the digital video. For example, as illustrated in FIG. 4B, the user interface manager 102 can display a recording time indicator 326. In one or more embodiments, the recording time indicator 328 may be a bar that extends from one side of the messaging graphical user interface 304 to indicate the length of the digital video recorded by the multimedia manager 106 so far. Accordingly, in one or more embodiments, the recording time indicator 326 indicates the length of the recording in real time.

In one or more embodiments, the multimedia manager 106 may be configured to allow recordings of a certain length (e.g., 60 seconds or less). In such embodiments, the recording time indicator 326 can also provide an indication of how much longer the recording may be before the multimedia manager 106 will stop recording (i.e., when the bar reaches the opposite side of the messaging graphical user interface 304 the multimedia manager 106 must stop recording). In one or more embodiments, when the record is reaching the time limit, the user interface manager 102 may update the instruction 324 with a warning, such as, "5 seconds remaining!"

A user may desire to cancel the capture and recording of a digital video before the communication manager 108 sends the digital video to one or more co-users. For example, as illustrated in FIG. 4B, the multimedia manager 106 may cancel the capture and recording of a digital video in response to a detected user interaction along the direction of the arrow 328. For instance, as described above, the multimedia manager 106 may capture and record a digital video via the camera viewfinder 316 in response to a detected press-and-hold touch gesture. In one or more embodiments, the user input detector 104 may detect an upward swipe gesture of the finger 314 of the user's hand during the press-and-hold touch gesture such that upon the detected release of the swipe gesture, the user's finger 314 is no longer interacting with the camera viewfinder 316. In response to this detected user interaction, the multimedia manager 106 may cancel the capture and recording of the digital video. As such, the electronic messaging system 100 may not automatically send any captured video or add any captured video to the communication thread 306 in such embodiments.

Additionally, in response to the detected user interaction described above, the multimedia manager 106 may also discard any portion of the digital video that had already been recorded and/or stored. Thus, in one or more embodiments, in response to a detected swipe touch gesture during the recording of a digital video, the multimedia manager 106 may delete the digital video. In one or more alternative embodiment, the multimedia manager 106 may save or store the portion of the digital video that was recorded before the detected swipe gesture without providing that portion of the digital video to the communication manager 108 and/or the user interface manager 102.

Once the multimedia manager 106 has canceled the capture and recording of a digital video, as described above, the user interface manager 102 may update the messaging graphical user interface 304. For example, as illustrated in FIG. 4C, the user interface manager 102 can update the messaging graphical user interface 304 to again include the message input control palette or toolbar 310, rather than the instruction 324. Additionally, in one or more embodiments, the user interface manager 102 can continue to display the communication thread 304 and the camera viewfinder 316 provided by the multimedia manager 106. As described above and as shown in FIG. 4C, the input control indicator 318 continues to indicate that the camera viewfinder input control 312b is active.

The multimedia manager 106 may capture and record a digital video via the camera viewfinder 316 in response to a detected user interaction. For example, as illustrated in FIG. 4D, the user input detector 104 may detect a press-and-hold touch gesture of the finger 314 of the user's hand with the camera viewfinder 316. In response to the detected press-and-hold touch gesture, the multimedia manager 106 can capture and record a multimedia content item consisting of a digital video via the camera viewfinder 316. Also as described above, the recording time indicator 326 can indicate a length of the recording.

In one or more embodiments, the communication manager 108 may send the captured multimedia content item (i.e., recorded digital video) to one or more co-users upon the detected release of a press-and-hold touch gesture. For example, as described above, the duration of a recorded digital video may be the same as the duration of a detected press-and-hold touch gesture of the finger 314 with the camera viewfinder 316. In a particular embodiment, upon the detected release of the press-and-hold touch gesture, the multimedia manager 106 can provide the captured and recorded digital video to the communication manager 108. In one or more alternative embodiments, the multimedia manager 106 may provide the digital video to the communication manager 108 in response to another type of user interaction, such as a spoken command, shaking the communication device 300, or any other type of user interaction suitable for this purpose. The communication manager 108 can then send the recorded video as a message.

Additionally, in one or more embodiments, in response to the detected release of the press-and-hold touch gesture, the multimedia manager 106 may provide the multimedia content item (i.e., the recorded digital video) to the user interface manager 102. Additionally or alternatively, before providing the multimedia content item 330 to the user interface manager 102, the multimedia manager 106 may first package the multimedia content.

In one or more embodiments, when added to the communication thread 306, the multimedia content item 330 can include a playback control 329. The playback control 329 can comprise an interactive control that plays a digital video within the communication thread 306 of the messaging graphical user interface 304 in response to a detected user interaction. For example, as illustrated in FIG. 4E, the user input detector 104 may detect a tap touch gesture of the finger 314 of the user's hand with the playback control 329. In one or more embodiments, in response to the detected tap touch gesture on the playback control 329, the user interface manager 102 can cause the recorded digital video 330 to play within the communication thread 306. In one or more alternative embodiments, the user interface manager 102 may play a digital video in response to other types of user interactions, such as a spoken command, a double tap, or any other type of user input suitable for this purpose. In still further embodiments, the user interface manager 102 can automatically play the digital video in the communication thread 306. In such embodiments, the digital video 330 may not include a play back control 329.

As illustrated in FIG. 4F, and as described above, in one or more embodiments, the user interface manager 102 continues to display the other display elements while the recorded digital video 330 plays. For example, as shown in FIG. 4F, the user interface manager 102 can continue to display the message input control palette or toolbar 310 as well as the camera viewfinder 316.

In one or more embodiments, the user interface manager 102 may provide a playback indicator associated with the recorded digital video 330, in order to indicate how much of the digital video has been played and how much of the digital video remains un-played. For example, as illustrated in FIG. 4F, the user interface manager 102 can display the playback indicator 332. As shown, user interface manager 102 has played approximately one-third of the digital video 330.

As discussed above with regard to digital photographs, the multimedia manager 106 may also provide options for adding effects to captured digital videos. For example, in one or more embodiments, the multimedia manager 106 may provide a variety of effects that may be added to a captured digital video such as, but not limited to: color effects (i.e., altering the color of the digital video), overlay effects (i.e., add a border to a digital video), sound effects (i.e., add a background track to a digital video), or any other suitable effect. As described above, the multimedia manager 106 may be preconfigured with one or more effects such that no user interaction is required between the capture of the digital video and the sending of the digital video with the one or more co-users.

In response to a detected user interaction, the user interface manager 102 may replace the camera viewfinder 316 with another control. For example, as illustrated in FIG. 4G, the user input detector 104 may detect a user interaction of the finger 314 of the user's hand interacting with the text input control 312a within the message input control palette or toolbar 310. In one or more embodiments, in response to the detected selection of the text input control 312a (as indicated by the input control indicator 318), the user interface manager 102 may replace the camera viewfinder 316 with a touch screen display keyboard 322. In one or more alternative embodiments, the user interface manager 102 may replace the camera viewfinder 316 with other types of controls in response to the detected selection of any of the input controls 312a-312b.

Figure 5:
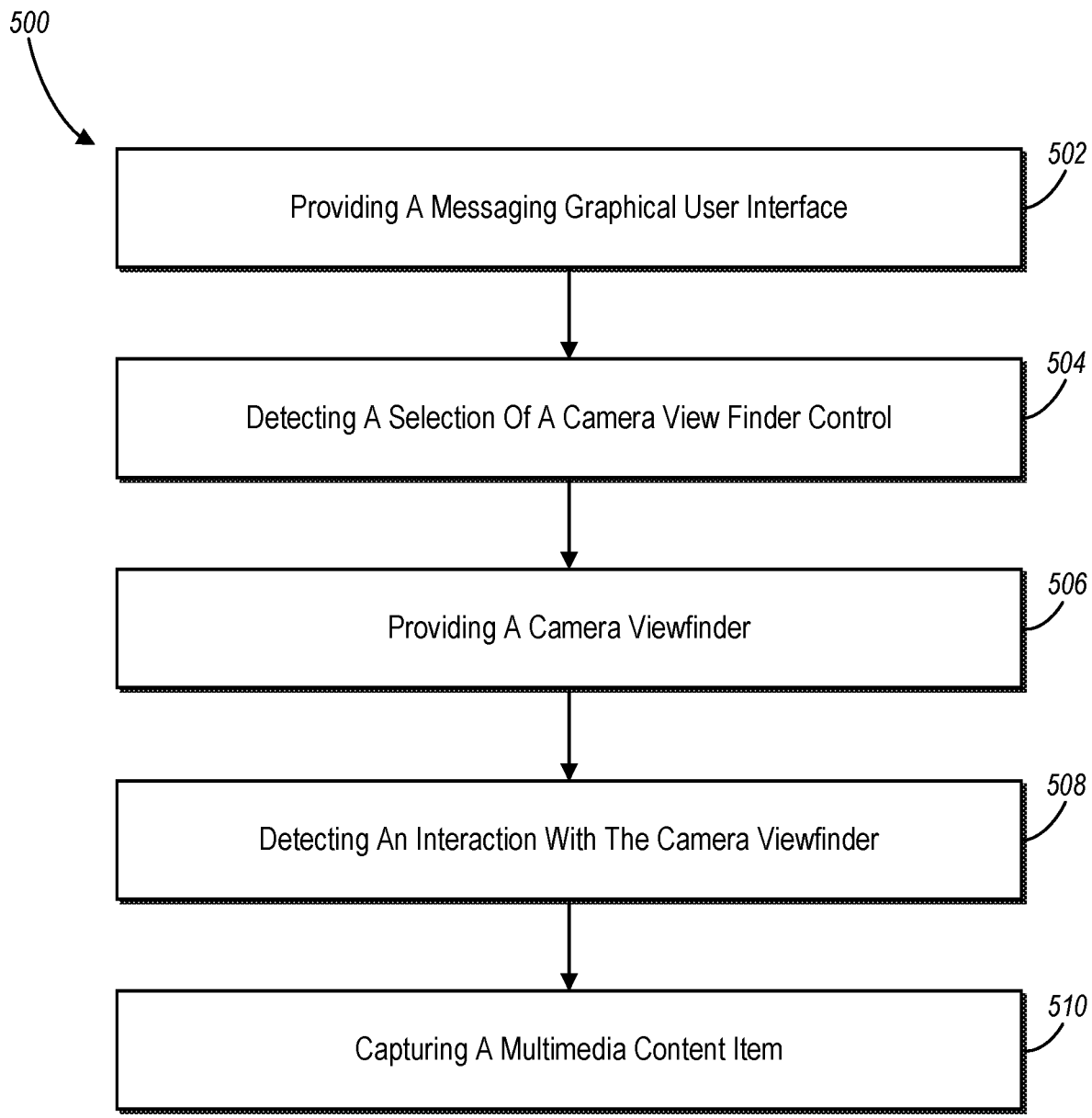
FIG. 5 illustrates a flowchart of a series of acts in a method of capturing and sending multimedia content items as electronic messages in accordance with one or more embodiments.
Figure 6:
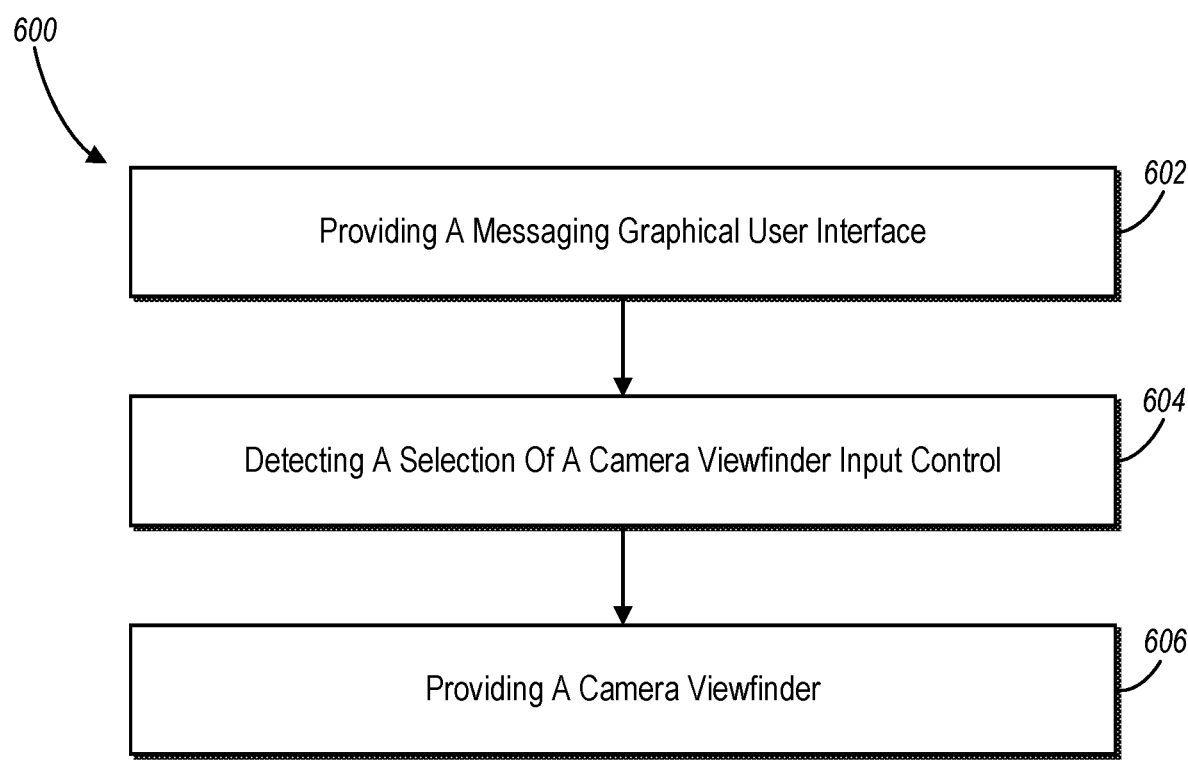
FIG. 6 illustrates a flowchart of a series of acts in another method of capturing and sending multimedia content items as electronic messages in accordance with one or more embodiments.

FIGS. 1-4G, the corresponding text, and the examples, provide a number of different systems and devices for capturing and including multimedia content item in a communication session. In addition to the foregoing, embodiments of the present invention can also be described in terms of flowcharts comprising acts and steps in a method for accomplishing a particular result. For example, FIGS. 5 and 6 illustrate flowcharts of exemplary methods in accordance with one or more embodiments of the present invention. The methods described in relation to FIGS. 5 and 6 may be performed with less or more steps/acts or the steps/acts may be performed in differing orders. Additionally, the steps/acts described herein may be repeated or performed in parallel with one another or in parallel with different instances of the same or similar steps/acts.

FIG. 5 illustrates a flowchart of one example method 500 of capturing and sending multimedia as electronic messages. The method 500 includes an act 502 of providing a messaging graphical user interface. In particular, the act 502 can involve providing a messaging graphical user interface 304 that includes a communication thread 306. In one or more embodiments, the communication thread 306 may include a plurality of electronic messages 308a, 308b exchanged between a user and one or more co-users.

The method 500 further includes an act 504 of detecting a selection of a camera viewfinder input control. In particular, the act 504 can involve detecting a tap touch gesture interacting with the camera viewfinder input control 312b. In one or more embodiments, detecting a selection of a camera viewfinder input control 312b may include detecting a selection of a camera viewfinder input control 312b from a palette of one or more additional input controls 310.

Furthermore, the method 500 includes an act 506 of providing a camera viewfinder. In particular, the act 504 can involve providing a camera viewfinder 316 within a portion of the messaging graphical user interface 304. In one or more embodiments, the messaging graphical user interface 304 may include the communication thread 306 in a first portion and the camera viewfinder 316 in a second portion.

The method 500 also includes an act 508 of detecting an interaction with the camera viewfinder. In particular, the act 508 can involve detecting a first user interaction with the camera viewfinder 316. For example, in one or more embodiments, detecting the first user interaction with the camera viewfinder 316 can include detecting a tap touch gesture with the camera viewfinder 316. The method 500 may further include detecting a second user interaction with the camera viewfinder 316. For example, in one or more embodiments, detecting the second user interaction with the camera viewfinder 316 can include detecting a press-and-hold touch gesture with the camera viewfinder 316.

Additionally, the method 500 includes an act 510 of capturing a multimedia content item. In particular, the act 510 can involve, in response to the detected first user interaction, capturing a multimedia content item 320 and sending the captured multimedia content item 320 as an electronic message 308a, 308b. For example, in one or more embodiments, capturing a multimedia content item 320 includes capturing a digital photograph in response to a detected tap touch gesture. Furthermore, in one or more embodiments, capturing a multimedia content item 320 includes capturing a digital video in response to a detected press-and-hold touch gesture. In one or more embodiments, the duration of the captured digital video may be the same as the duration of the detected press-and-hold touch gesture.

The method 500 may further include adding the captured multimedia content item 320 to the communication thread 306. For example, in one or more embodiments, the method 500 may include adding a captured digital photograph to the communication thread 306. Additionally, in one or more embodiments, the method 500 may include, in response to a detected release of a press-and-hold touch gesture, adding a playback control 330 to a captured digital video to the communication thread 306.

FIG. 6 illustrates a flowchart of a method 600 of capturing and sending multimedia as electronic messages. The method 600 includes an act 602 of providing a messaging graphical user interface. In particular, the act 502 can involve providing a messaging graphical user interface 304 with a communication thread 306 in a first portion of the messaging graphical user interface 304. In one or more embodiments, the communication thread 306 may include a plurality of electronic messages 308a, 308b exchanged between a user and one or more co-users.

The method 600 further includes an act 604 of detecting a selection of a camera viewfinder input control. In particular, the act 604 can include detecting a tap touch gesture interacting with the camera viewfinder input control 312b. In one or more embodiments, detecting a selection of a camera viewfinder input control 312b may include detecting a selection of a camera viewfinder control 312b from a palette of input controls 310.

The method 600 also includes an act 606 of providing a camera viewfinder. In particular, the act 606 can involve, in response to the selection of the camera viewfinder input control 312b, providing a camera viewfinder 316 within a second portion of the messaging graphical user interface 304. In one or more embodiments, the first portion of the messaging graphical user interface 304 and the second portion of the messaging graphical user interface 304 are displayed simultaneously.

The method 600 may further include detecting a tap touch gesture within the second portion of the messaging graphical user interface 304. For example, in one or more embodiments, the tap touch gesture may interact with the camera viewfinder 316. In response to the detected tap touch gesture within the second portion of the messaging graphical user interface 304, the method 600 may also include capturing a digital photograph via the camera viewfinder 316. The method 600 may further include sending the captured digital photograph and adding the captured digital photograph to the communication thread 306 in the first portion of the messaging graphical user interface 304.

Additionally, the method 600 may include detecting a press-and-hold touch gesture within the second portion of the messaging graphical user interface 304. During the duration of the detected press-and-hold touch gesture within the second portion of the messaging graphical user interface 304, the method 600 may include capturing a digital video via the camera viewfinder 316. Additionally, in response to a detected release of the press-and-hold touch gesture, the method 600 may include sending the captured digital video. Also in response to the detected release of the press-and-hold touch gesture, the method 600 may include adding a playback control 330 capable of playing the captured digital video to the communication thread 306 in the first portion of the messaging graphical user interface 304.

Furthermore, the method 600 may include detecting a tap touch gesture with a playback control 330. For example, in one or more embodiments, detecting a tap touch gesture with a playback control 330 may include detecting a tap touch gesture with a playback control 330 in the communication thread 306 in the first portion of the messaging graphical user interface 304. In response to the detected tap touch gesture with the playback control 330, the method 600 may include playing the captured digital video in the communication thread 306 in the first portion of the messaging graphical user interface 304.

The method 600 may include detecting a selection of a message input control 312a-e from a palette of message input controls 310. For example, detecting a selection of a message input control 312a-e may include detecting a tap touch gesture interacting with a message input control 312a. In response to the detected selection, the method 600 may further include removing the camera viewfinder 316 from the second portion of the messaging graphical user interface 304.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
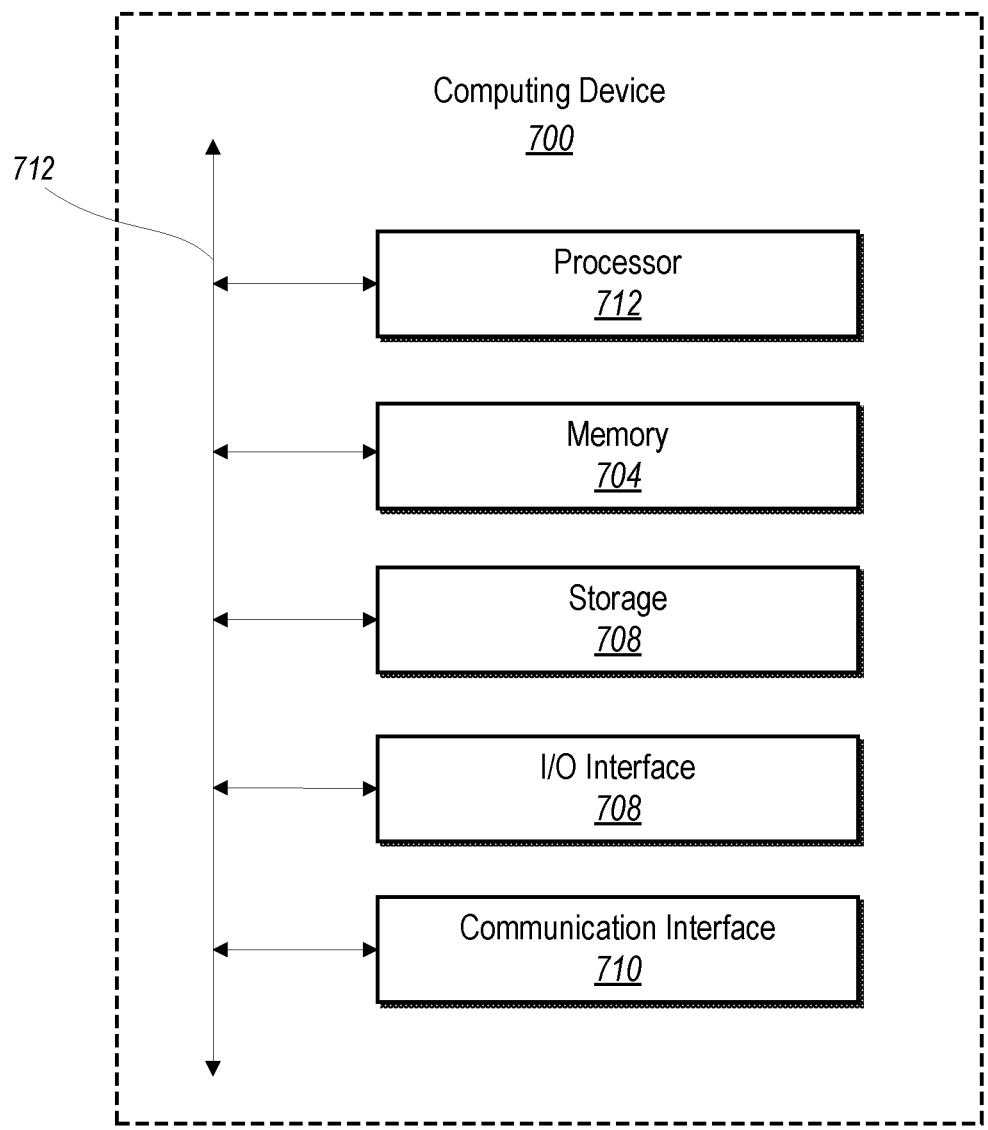
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the electronic messaging system 100. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the network 206 and/or communication server 208 can comprise a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 8:
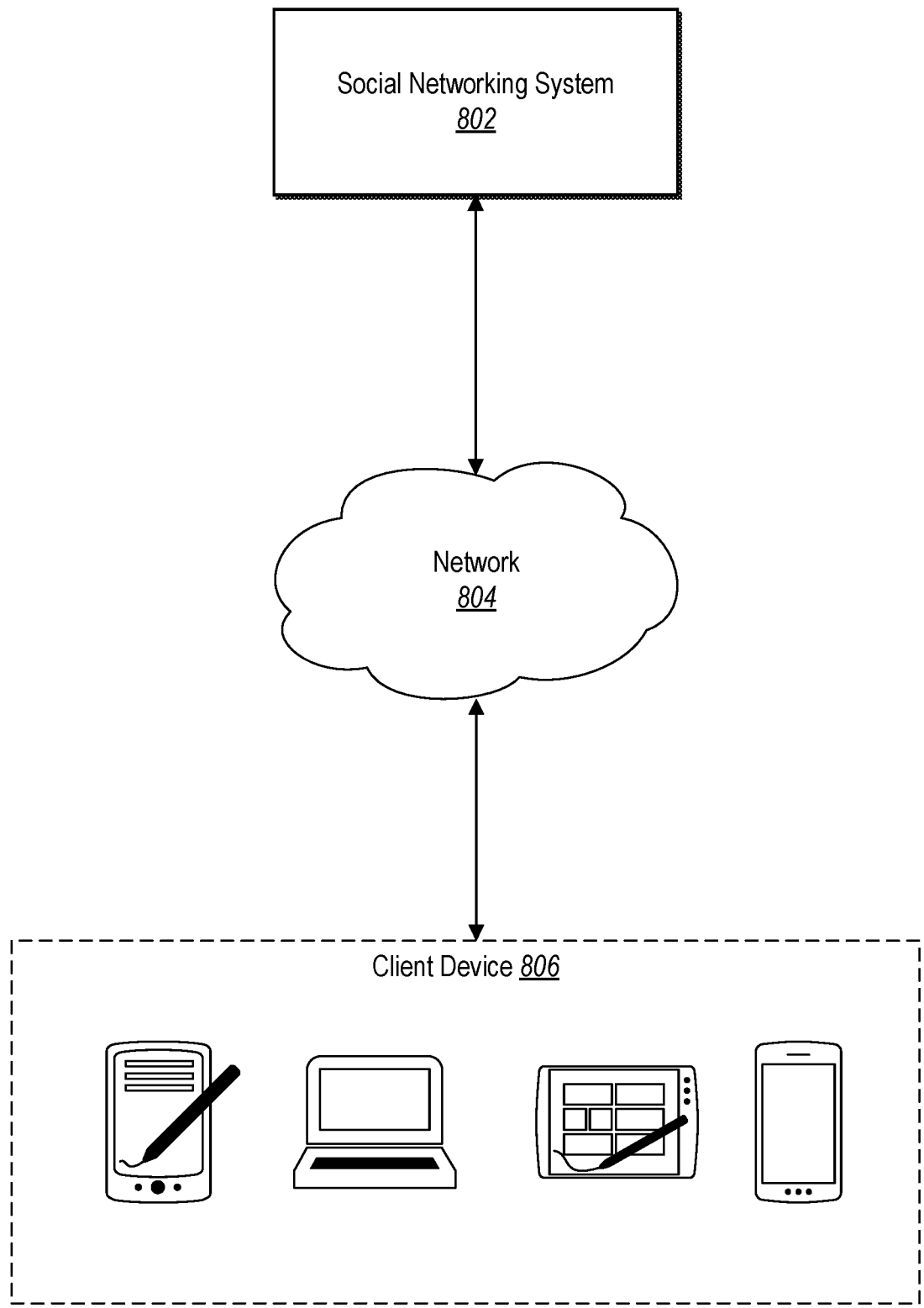
FIG. 8 is an example network environment of a social networking system in accordance with one or more embodiments.

FIG. 8 illustrates an example network environment of a social-networking system. In one or more embodiments, a social-networking system 802 may comprise one or more data stores. For example, the social-networking system 802 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In one or more embodiments, the social-networking system 802 may comprise one or more computing devices (e.g., servers) hosting functionality directed to operation of the social-networking system. A user of the social-networking system 802 may access the social-networking system 802 using a client device such as client device 806. For instance, the client device 806 can interact with the social-networking system 802 through a network 804.

The client device 806 may be a desktop computer, laptop computer, tablet computer, personal digital assistant (PDA), in- or out-of-car navigation system, smart phone or other cellular or mobile phone, or mobile gaming device, other mobile device, or other suitable computing devices. Client device 806 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over a network 804.

Network 804 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 806 may access the social-networking system 802.

While these methods, systems, and user interfaces utilize both publicly available information as well as information provided by users of the social-networking system, all use of such information is to be explicitly subject to all privacy settings of the involved users and the privacy policy of the social-networking system as a whole.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:
1. A computer-implemented method comprising:
  providing, at a computing device, a messaging graphical user interface comprising a communication thread in a first portion and a message input control palette in a second portion below the first portion;

in response to a detected selection of a multimedia input control from the message input control palette in the second portion, adding a third portion comprising a camera viewfinder to the messaging graphical user interface below the second portion by reducing a display area of the communication thread in the first portion;

in response to a detected user interaction with the camera viewfinder, automatically capturing and sending a multimedia content item as an electronic message without further user interaction with the messaging graphical user interface;

detecting a selection of text input control from the message input control palette in the second portion of the messaging graphical user interface; and replacing the camera viewfinder in the third portion of the messaging graphical user interface with a touch screen display keyboard.

2. The computer-implemented method as recited in claim 1, further comprising:

detecting the user interaction with the camera viewfinder by detecting a tap touch gesture with the camera viewfinder; and wherein capturing and sending the multimedia content item comprises capturing and sending a digital image as the electronic message without further user interaction with the messaging graphical user interface.

3. The computer-implemented method as recited in claim 1, further comprising:

detecting the user interaction with the camera viewfinder by detecting a press-and-hold touch gesture with the camera viewfinder; and wherein capturing and sending the multimedia content item comprises capturing and sending a digital video as the electronic message without further user interaction with the messaging graphical user interface.

4. The computer-implemented method as recited in claim 3, wherein a duration of the digital video corresponds with a duration of the press-and-hold touch gesture.

5. The computer-implemented method as recited in claim 1, further comprising adding the electronic message comprising the multimedia content item to the communication thread in the first portion of the messaging graphical user interface.

6. The computer-implemented method as recited in claim 5, wherein adding the electronic message to the communication thread comprises adding a multimedia playback control associated with the multimedia content item to the communication thread.

7. The computer-implemented method as recited in claim 1, wherein the third portion displays the camera viewfinder with a live data stream from a camera of the computing device.

8. The computer-implemented method as recited in claim 1, further comprising:

detecting a second selection of the multimedia input control from the message input control palette in the second portion of the messaging graphical user interface; and removing the third portion from the messaging graphical user interface and enlarging the display area of the communication thread in the first portion of the messaging graphical user interface.

9. A system comprising:
at least one processor; and
at least one non-transitory computer-readable storage medium storing instructions thereon that, when executed by the at least one processor, cause the system to:

provide a messaging graphical user interface comprising a communication thread in a first portion and a message input control palette in a second portion below the first portion;

in response to a detected selection of a multimedia input control from the message input control palette in the second portion, add a third portion comprising a camera viewfinder to the messaging graphical user interface below the second portion by reducing a display area of the communication thread in the first portion;

in response to a detected user interaction with the camera viewfinder, automatically capture and send a multimedia content item as an electronic message without further user interaction with the messaging graphical user interface;

detect a selection of text input control from the message input control palette in the second portion of the messaging graphical user interface; and replace the camera viewfinder in the third portion of the messaging graphical user interface with a touch screen display keyboard.

10. The system as recited in claim 9, further storing instructions thereon that, when executed by the at least one processor, cause the system to:

detect the user interaction with the camera viewfinder by detecting a tap touch gesture with the camera viewfinder; and capture and send the multimedia content item by capturing and sending a digital image as the electronic message without further user interaction with the messaging graphical user interface.

11. The system as recited in claim 9, further storing instructions thereon that, when executed by the at least one processor, cause the system to detect the user interaction with the camera viewfinder by detecting a press-and-hold touch gesture with the camera viewfinder to capture a digital video as the electronic message.

12. The system as recited in claim 11, wherein a duration of the digital video corresponds with a duration of the press-and-hold touch gesture.

13. The system as recited in claim 11, further storing instructions thereon that, when executed by the at least one processor, cause the system to cancel the capture of the digital video upon detecting a swipe interaction within the camera viewfinder.

14. The system as recited in claim 9, further storing instructions thereon that, when executed by the at least one processor, cause the system to add the electronic message comprising the multimedia content item to the communication thread in the first portion of the messaging graphical user interface.

15. The system as recited in claim 14, further storing instructions thereon that, when executed by the at least one processor, cause the system to add the electronic message to the communication thread by adding a multimedia playback control associated with the multimedia content item to the communication thread.

16. A non-transitory computer-readable medium comprising instructions that, when executed by at least one processor, cause a computing device to:

provide a messaging graphical user interface comprising a communication thread in a first portion and a message input control palette in a second portion below the first portion;

in response to a detected selection of a multimedia input control from the message input control palette in the second portion, add a third portion comprising a camera viewfinder to the messaging graphical user interface below the second portion by reducing a display area of the communication thread in the first portion;

in response to a detected user interaction with the camera viewfinder, automatically capture and send a multimedia content item as an electronic message without further user interaction with the messaging graphical user interface;

detect a selection of text input control from the message input control palette in the second portion of the messaging graphical user interface; and replace the camera viewfinder in the third portion of the messaging graphical user interface with a touch screen display keyboard.

17. The non-transitory computer-readable medium as recited in claim 16, further comprising instructions that, when executed by the at least one processor, cause the computing device to:

detect the user interaction with the camera viewfinder by detecting a tap touch gesture with the camera viewfinder; and capture and send the multimedia content item by capturing and sending a digital image as the electronic message without further user interaction with the messaging graphical user interface.

18. The non-transitory computer-readable medium as recited in claim 16, further comprising instructions that, when executed by the at least one processor, cause the computing device to:

detect the user interaction with the camera viewfinder by detecting a press-and-hold touch gesture with the camera viewfinder; and capture and send the multimedia content item by capturing and sending a digital video as the electronic message without further user interaction with the messaging graphical user interface.

19. The non-transitory computer-readable medium as recited in claim 18, wherein a duration of the digital video corresponds with a duration of the press-and-hold touch gesture.

20. The non-transitory computer-readable medium as recited in claim 16, further comprising instructions that, when executed by the at least one processor, cause the computing device to:

detect a second selection of the multimedia input control from the message input control palette in the second portion of the messaging graphical user interface; and remove the third portion from the messaging graphical user interface and enlarge the display area of the communication thread in the first portion of the messaging graphical user interface.

* * * * *